Sept. 22, 1970 A. M. REITER ET AL 3,530,232

SUBSCRIPTION TELEVISION SYSTEM

Filed June 17, 1966 16 Sheets-Sheet 1

NORMALIZED SUBSCRIPTION TELEVISION CHANNEL FREQUENCY PLAN SHOWING LOCATION OF CARRIERS $CA_1$, $C_V$ AND $CA_2$ AND THEIR SIDEBANDS

INVENTORS.
ABRAHAM M. REITER
PATRICK R. J. COURT
BY Samuel Lindenberg
ATTORNEY

BLOCK DIAGRAM OF AN INSTALLATION AT A TELEVISION TRANSMITTER

INVENTORS
ABRAHAM M. REITER
PATRICK R. J. COURT
BY Samuel Lindenberg
ATTORNEY

INVENTORS.
ABRAHAM M. REITER
PATRICK R. J. COURT
BY Samuel Lindenberg
ATTORNEY

SUBSCRIPTION TELEVISION SYSTEM

Filed June 17, 1966

BLOCK DIAGRAM OF GREY BLANK VIDEO, RESTORING AND CODE SIGNAL GENERATOR 12

INVENTORS.
ABRAHAM M. REITER
PATRICK R. J. COURT
BY Samuel Lindenberg
ATTORNEY

INVENTORS.
ABRAHAM M. REITER
PATRICK R. J. COURT
BY Samuel Lindenberg
ATTORNEY

INVENTORS.
ABRAHAM M. REITER
PATRICK R. J. COURT
BY Samuel Lindenberg

ATTORNEY

SUBSCRIPTION TELEVISION SYSTEM

Filed June 17, 1966

BLOCK DIAGRAM OF MODE CONTROL, CODE TONE AND CODE CHECKING TONE GENERATOR -130

INVENTORS.
ABRAHAM M. REITER
PATRICK R. J. COURT
BY Samuel Lindenberg
ATTORNEY

WAVEFORMS

INVENTORS
ABRAHAM M. REITER
PATRICK R. J. COURT
BY Samuel Lindenberg
ATTORNEY

Sept. 22, 1970 A. M. REITER ET AL 3,530,232

SUBSCRIPTION TELEVISION SYSTEM

Filed June 17, 1966 16 Sheets-Sheet 9

WAVEFORMS

INVENTORS.
ABRAHAM M. REITER
PATRICK R. J. COURT
BY Samuel Lindenberg
ATTORNEY

BLOCK DIAGRAM OF THE DECODER ATTACHMENT

INVENTORS.
ABRAHAM M. REITER
PATRICK R. J. COURT
BY Samuel Lindenberg
ATTORNEY

SUBSCRIPTION TELEVISION SYSTEM

Filed June 17, 1966 16 Sheets-Sheet 11

BLOCK DIAGRAM OF MODE-SELECTION CONTROL UNIT 216

INVENTORS.
ABRAHAM M. REITER
PATRICK R. J. COURT
BY Samuel Lindenberg
ATTORNEY

Sept. 22, 1970 A. M. REITER ET AL 3,530,232

SUBSCRIPTION TELEVISION SYSTEM

Filed June 17, 1966 16 Sheets-Sheet 12

SCHEMATIC OF SYNC. AND BLANKING GENERATOR 210 AND AUGMENTER 206

SCHEMATIC OF SYNC. AND BLANKING GENERATOR 210 AND AUGMENTER 206 FOR INVERTED POLARITY GREY BLANK VIDEO MODULATION

INVENTORS.
ABRAHAM M. REITER
PATRICK R. J. COURT
BY Samuel Lindenberg
ATTORNEY

COMPOSITE GREY BLANK VIDEO, SYNC. RESTORING, BLANK RESTORING, AND RESTORED COMPOSITE VIDEO WAVEFORMS

WAVEFORM DIAGRAM ILLUSTRATING RESTORATION OF GREY BLANK VIDEO, MODULATED UPON AN I F CARRIER

INVENTORS.
ABRAHAM M. REITER
PATRICK R. J. COURT
BY
Samuel Lindenberg
ATTORNEY

INVENTORS.
ABRAHAM M. REITER
PATRICK R. J. COURT
BY Samuel Lindenberg
ATTORNEY

BLOCK DIAGRAM OF DECODER ATTACHMENT FOR RECONSTITUTING INVERTED MODULATION GREY BLANK VIDEO AND ENCODED AUDIO

INVENTORS.
ABRAHAM M. REITER
PATRICK R. J. COURT
BY Samuel Lindenberg
ATTORNEY

Sept. 22, 1970 A. M. REITER ET AL 3,530,232

SUBSCRIPTION TELEVISION SYSTEM

Filed June 17, 1966 16 Sheets-Sheet 16

BLOCK DIAGRAM OF INTEGRATED TV RECEIVER-DECODER

INVENTORS.
ABRAHAM M. REITER
PATRICK R. J. COURT
BY Samuel Lindenberg

ATTORNEY

United States Patent Office
3,530,232
Patented Sept. 22, 1970

3,530,232

SUBSCRIPTION TELEVISION SYSTEM

Abraham M. Reiter, Reseda, and Patrick R. J. Court, Los Angeles, Calif., assignors to International Telemeter Corporation, Los Angeles, Calif., a corporation of New York Filed June 17, 1966, Ser. No. 558,401
Int. Cl. H04k *1/00;* H04n *1/44*
U.S. Cl. 178—5.1 22 Claims

ABSTRACT OF THE DISCLOSURE

A subscription television system has a transmitter at which the generated sync and blanking signals are reduced to the gray level, which is amplitude modulated on the video carrier. Program information audio is frequency modulated upon a first audio carrier and program audio signals are frequency modulated on a second audio carrier which is lower in frequency than the first audio carrier, and which is also frequency modulated with the program information audio.

Sync restoration signals are also generated at the transmitter and are then encoded. For decoding control code signals are generated. Sync restoration signals and control code signals are amplitude modulated on the second audio carrier.

A receiver attachment is connected between the antenna and the receiver input and allows the program information audio to be reproduced by the receiver and the video picture is unintelligible until a subscriber pays for the program. Then the sync is restored, the video picture becomes intelligible, and the program audio signals are supplied to the receiver to be reproduced in place of the program information audio.

This invention relates to subscription television systems, and more particularly to improvements therein.

In a U.S. patent to Weiss, Pat. No. 2,907,816, there is proposed a subscription television system in which the blanking and synchronizing signals which occur at only a horizontal rate are reduced to a constant "grey" level. At a suitable receiver attachment only the horizontal sync signals are restored in an augmenter using a single mode pulse signal formed from a 15.750 kHz. sine wave transmitted in another channel.

In U.S. Pat. No. 3,001,011, by Weiss et al., there is described a subscription television system which has a grey-blank video encoding and decoding arrangement in which a sine wave restoring signal is multiplexed in the audio channel in combination with encoded audio in two modes, with cryptography being applied to the audio channel. Randomly sequenced control tones are used to control the audio mode selection switch with a control effect being derived from a negating signal which is obtained when the mode switch is incorrectly synchronized with the transmitter.

In U.S. Pat. No. 3,184,537 to Court et al., there is described a "grey-blank" video encoding and decoding method in which both the horizontal and vertical sync and blanking intervals are suppressed to a constant grey level and are restored by an augmenting signal having the form of composite sync pulses, which are amplitude modulated upon the normal audio carrier. Here the normal audio carrier is modulated with program information audio and the program audio is hidden (but not encoded) by being simply transmitted on a new FM carrier at a frequency 1.0 mHz. below the video carrier. In the receiver attachment all three carriers are converted to intermediate frequencies, the video carrier being augmented at IF, and the information IF carrier being suppressed and replaced by the program IF carrier by frequency transposition. Finally, both the restored video IF carrier and transposed program audio IF carrier are converted to standard television channel frequencies for use by the subscriber's receiver.

In the three systems briefly described, the blanking signals, which are suppressed to grey (50%), remain unrestored in the receiver attachment. Only the suppressed sync is restored and the decoded picture suffers from visible retrace. The retrace is more or less visible depending upon the picture content of the video and, to some extent upon the characteristics of the subscriber's television receiver.

In a U.S. Pat. No. 3,231,818, to Court, there is described an improved audio secrecy system which invokes the concept of double FM as an encoding means. In addition to hiding it by frequency modulating the program audio upon a new carrier 1.0 mHz. below the video carrier, the audio is encoded by independently frequency modulating the new carrier with program information audio. The carrier deviation due to the information audio is equal in magnitude to the information deviation of the normal audio carrier and the deviations may be in phase or in antiphase. In a receiver attachment, the information deviation of the program audio carrier is cancelled in an intercarrier mixer, leaving only program audio deviation, and the carrier is repositioned with respect to the video carrier by a series of mixers. These processes occur at IF frequencies before conversion to standard channel frequencies. While the audio security in this system is far superior to those previously employed, it is still theoretically susceptible to stealing, by skillful individuals, by modifying the audio IF system of a television receiver (and thereby sacrificing that receiver for normal television reception).

An object of this invention is the provision of a novel subscription television system which gives a greater audio security than any of the systems described heretofore.

Yet another object of the present invention is the provision of an improved subscription television system using composite "grey-blanking" in which the sync and blanking signals are restored in such a manner that retrace lines are eliminated.

Still another object of the present invention is the provision of an improved and novel arrangement for encoding and decoding both audio and video television signals.

Yet another object of this invention is the provision of an auxiliary transmitter with which a standard transmitter may be converted to a subscription television transmitter.

These and other objects of the invention may be achieved by providing, at a transmitter, means for reducing the sync and blanking signals in a composite video signal to the grey level whereby composite "grey-blank video" is generated. This grey-blank video is amplitude modulated upon the usual video carrier. Also generated at the studio transmitter are program information audio signals which can comprise information concerning a program which is to be transmitted, as well as its price, for example. This program information audio is frequency modulated upon the usual audio carrier. However, the deviation permitted in response to the program information audio is less than that usually permitted to program audio, for example one-half the usual deviation.

There are also provided at the transmitter the usual program audio signals which are frequency modulated upon a second audio carrier which is lower in frequency than the video carrier. The deviation of the program audio is the usual deviation which occurs with television program audio. The new audio carrier is also frequency modulated with program information audio with a full deviation.

Also present at the transmitter is a means for generating restoration signals, which are used for reinserting the composite blanking and sync signals in the grey-blank video at a subscriber receiver. These signals which may be called reconstituting signals or augmenting signals are encoded at the transmitter. Control code or tone signals are generated in the process of encoding the reconstituting signals. The reconstituting signals and control code signals are combined and amplitude modulated upon the new carrier together with the program information audio FM and program audio FM. The three carriers are then combined by suitable diplexers at the transmitter and transmitted.

At a subscriber's location, if the subscriber has the usual commercial television receiver, a receiver attachment is employed which is connected between the antenna or incoming cable if wire is used ,and the antenna terminals of the receiver. Otherwise, a special television receiver may be provided for the subscriber. The receiver attachment has provision for converting the three carriers to suitable IF frequencies. These three IFs are separated. In the event that a subscriber has not paid or indicated that he will pay for a program being received, the attachment converts the video and audio carrier modulated with program information audio to carriers having frequencies such that they can be processed by the commercial television receiver. The commercial television receiver will reproduce the program information audio, but because of the grey-blank video, there will be nothing of entertainment value displayed on the cathode ray tube of the receiver.

The encoding process at the transmitter entails the selection of four out of ten possible tones, out of which, during vertical retrace, a tone is randomly selected for encoding the reconstituting signals. More specifically, the reconstituting signals are sent in either a normal or delayed mode in response to the selected ones of these tones. The change in the mode occurs during a vertical retrace interval.

A subscriber is required at a receiver to actuate switches to select the outputs of four out of ten tone filters. The receiver demodulates the code or tone signals as well as the reconstituting signals from the new audio carrier. Should the subscriber have properly actuated the tone selecting equipment, then the receiver attachment also makes provision for complementarily correcting the mode of the reconstituting signals to compensate for the encoding at the transmitter. In addition to setting the tone selecting switches properly a subscriber may also be required to either pay or signify payment liability before the mode correction activity can take place. Should these two actions have been properly carried out by the subscriber, then in addition to the augmenting signals being properly corrected, circuits are energized which remove the amplitude modulation of the new carrier (now at an intermediate frequency) and alter the frequencies of the new carrier together with the usual program audio carrier so that by the judicious use of mixers the program information audio frequency modulation may be cancelled leaving a carrier modulated with program audio.

Provision is also made for removing the two audio carriers from the video carrier. The reconstituting signals are then applied, by means of a unique circuit arrangement, to the video carrier to reinsert composite sync together with blanking signals into the video. Thereafter, the program carrier, which has now been converted to an IF frequency normally related to the video carrier at IF, is combined with the video carrier. The combined signals are then converted to frequencies suitable for processing by the usual television receiver.

Where a special subscriber receiver is used, the reconversion to a new carrier frequency suitable for a processing by a commercial television receiver is omitted and instead the audio and video IF carriers are processed directly.

Provision is also made for detecting when a subscriber has not properly set his control tone selecting equipment. Circuitry is provided which detects the effects of the improper setting upon the reconstituting signals to generate a control signal which is used to prevent the operation of certain of the circuits necessary for converting the signals received from the transmitter to signals which can be used by the receiver.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIG. 1 is a drawing of the normalized frequency plan of a subscription television channel, in accordance with this invention, which shows the location of the transmitted carriers and their sidebands.

$C_V$ is the normal video carrier, which, in accordance with this invention, is amplitude modulated with "grey-blank" video, instead of normal video. Grey-blank video is video in which both sync and blanking signals are in the grey (50%) area.

$C_{A2}$ is the normal audio carrier, which, in accordance with this invention, is frequency modulated with program information audio instead of normal program audio. Program information audio is audio which advertises the program and the cost of viewing it. In a preferred embodiment of this invention, the peak deviation of this carrier is caused to be 50% of normal, i.e., ±12.5 kHz, instead of ±25.0 kHz. The instantaneous deviation of $C_{A2}$, due to program information, may be conveniently defined at a particular instant as ±fi./2.

$C_{A1}$ is the program audio carrier, which is a new carrier located at a preferred frequency 1.0 mHz. below the video carrier. It is frequency modulated with program audio and is also independently frequency modulated with information audio. Additionally, it is amplitude modulated with a composite restoring, code and code checking signals. The peak deviation of this carrier due to the program audio is normal, i.e., ±25.0 kHz., and the deviation at any instant may conveniently be defined as $+fp$. The peak deviation due to the information audio is also a normal ±25.0 kHz., making the total peak deviation of this carrier ±50.0 kHz. The deviation due to information audio, in the prefered embodiment of this invention, is precisely twice that of the $C_{A2}$ carrier and is also in the same sense or phase. Thus the deviation of $C_{A1}$, due to information audio, may be conveniently defined at any instant as $\pm fi$, and the sum of both deviations on $C_{A1}$ may be defined as $fp+fi$.

Figure 2:
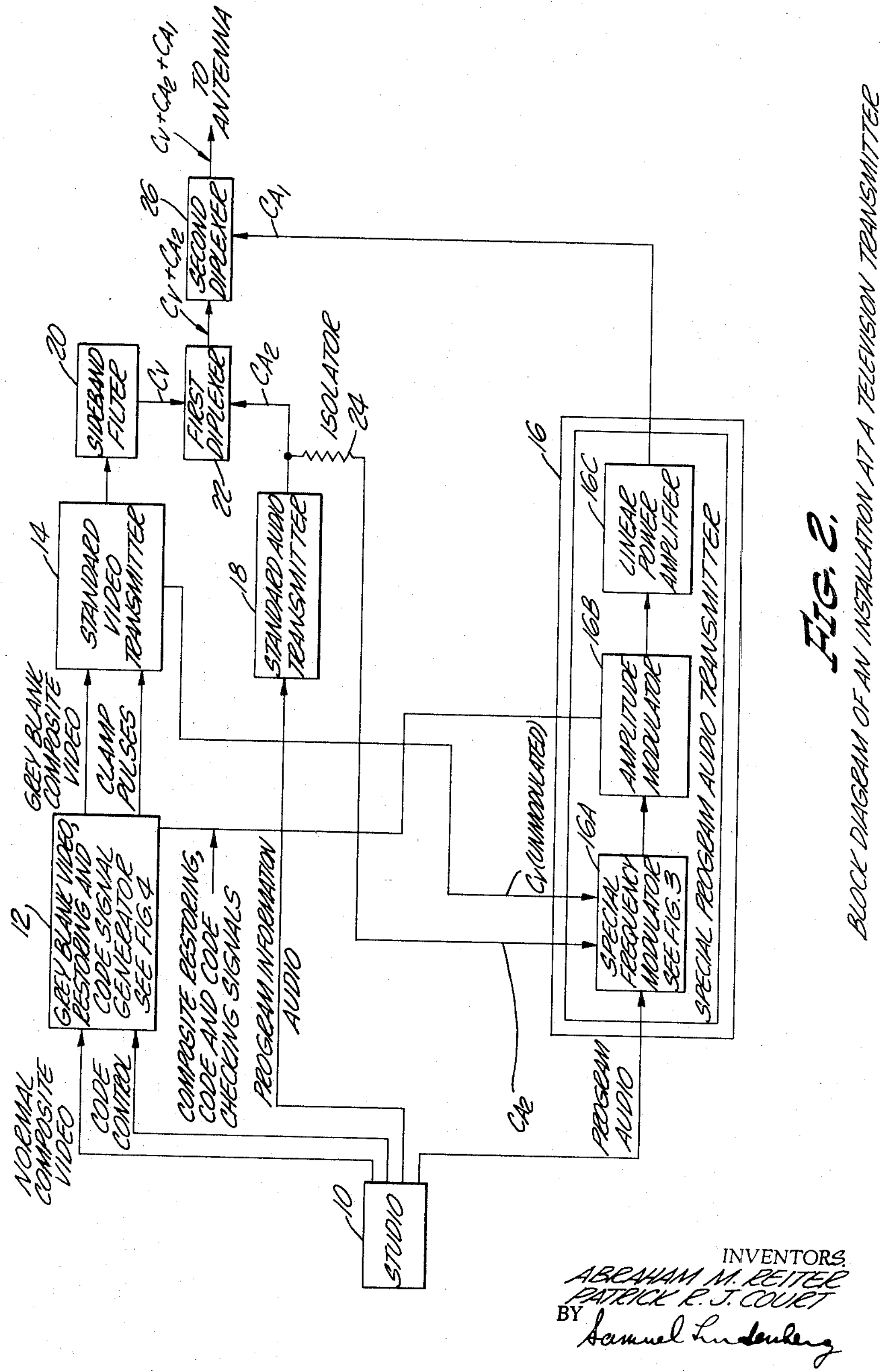
FIG. 2 is a simplified block diagram of an installation at a television transmitter in accordance with this invention.

FIG. 2 is a drawing of a simplified block diagram of a television transmitter, in accordance with this invention, which is adapted to radiate the new carrier $C_{A1}$ with its special modulations, in addition to the normal $C_V$ and $C_{A2}$ carriers.

Figure 4:
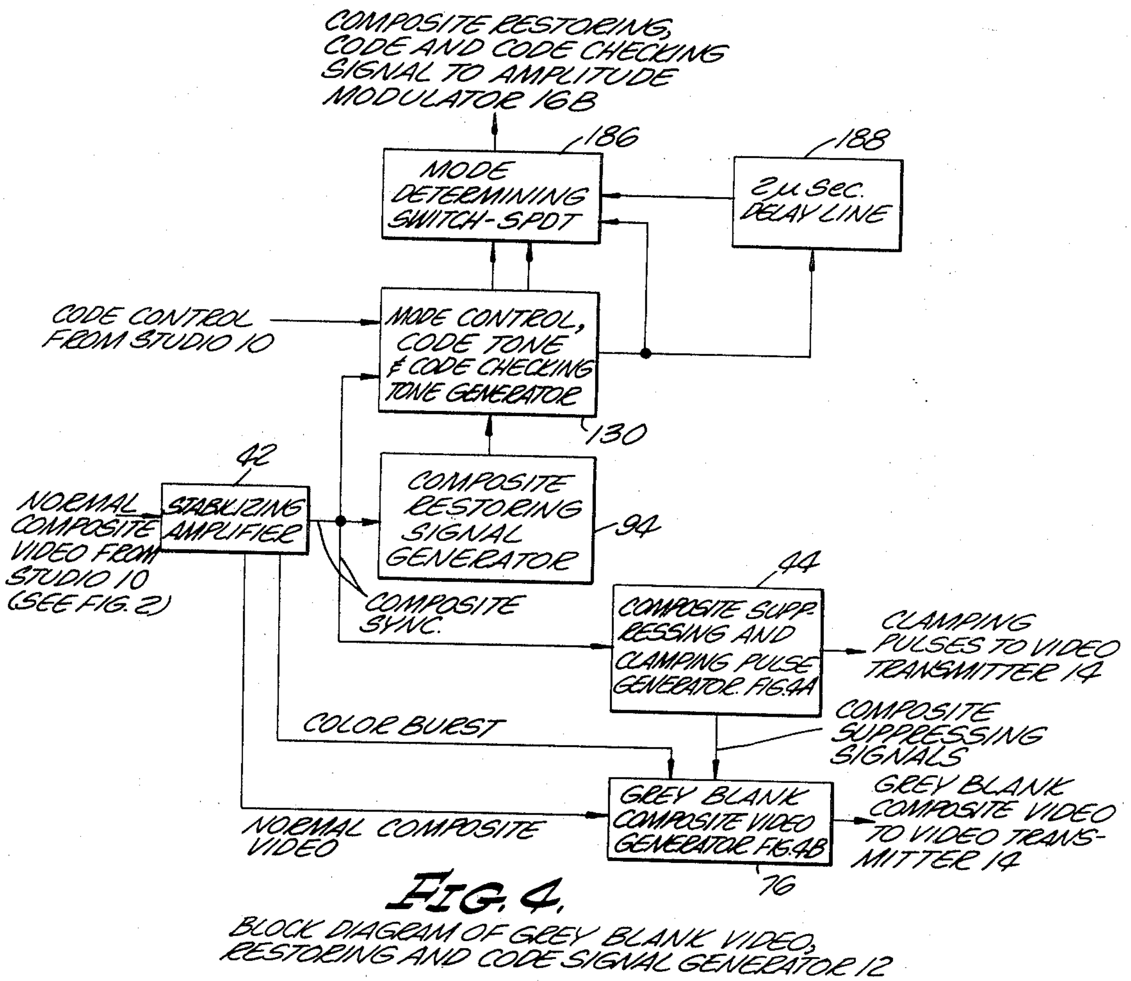
FIG. 4 is a block schematic diagram of the details of a signal generator 12 used at the transmitter in this invention.

There is generated at a television studio 10, normal composite video and code control signals which are applied to circuitry designated as grey-blank video, restoring and code signal generator 12. The details of this are shown in FIG. 4. The generator 12 produces as output, grey-blank composite video and clamp pulses for DC referencing the grey-blank video which are applied to a standard video transmitter 14, also composite restoring signals and code and code checking signals which are applied to a special program audio transmitter 18 to amplitude modulate the $C_{A2}$ carrier. Program audio is also applied to the special program transmiter 16. Program information audio is applied to the studio 10 to a standard audio transmitter 18.

The output of the standard video transmitter which is an amplitude modiulated carrier, (grey-blank video amplitude modulated on carrier $C_V$) is applied to the usual sideband filter 20. The output of sideband filter 20 is applied to a first diplexer 22, which combines therewith the output of the standard audio transmitter 18, which is the standard audio carrier $C_{A2}$ which is frequency modulated with program information audio at one-half the normal deviation, is represented as $$C_{A2}+\frac{fi}{2}$$

A portion of the output of the transmitter 18 is tapped through an isolating resistor 24, and applied to the special program transmitter 16. Also applied thereto is some unmodulated video carrier $C_V$ from the standard video transmitter 14.

The output of the special program audio transmitter consisting of the modulated $C_{A1}$ carrier is combined with the modulated $C_V$ and $C_{A2}$ carriers by the second diplexer 26.

In FIG. 2, it is seen that the special transmitter 16 contains a special frequency modulator 16A, an amplitude modulator 16B, and a linear power amplifier 16C. The amplitude modulator 16B amplitude modulates the frequency modulated carrier output from special frequency modulator 16A, with the composite restoring, code and code checking signal output from the generator 12. Linear power amplifier 16C raises the power level of the compositely modulated carrier output from 16B to be compatible with the existing power levels of $C_V$ and $C_{A2}$. The operation of modulator 16B and amplifier 16C are well known to those skilled in the art and need not be considered in further detail. The special frequency modulator 16A receives, as one input, a source of program audio from the studio 10. It also receives as an input a small level of the frequency modulated program information carrier output from the standard audio transmitter 18 through the isolating resistor 24. As a third input, modulator 16 receives a low level of the unmodulated video carrier $C_V$, derived from an appropriate point in the video transmiter 14. It will be remembered that the $C_{A2}$ carrier output from audio transmitter 18, which is of course modulated with program informaiton, is deviated only ±12.5 kHz., and this is simply achieved by adjusting the deviation level in the freqeuncy modulator portion of audio transmitter 18.

Figure 3:
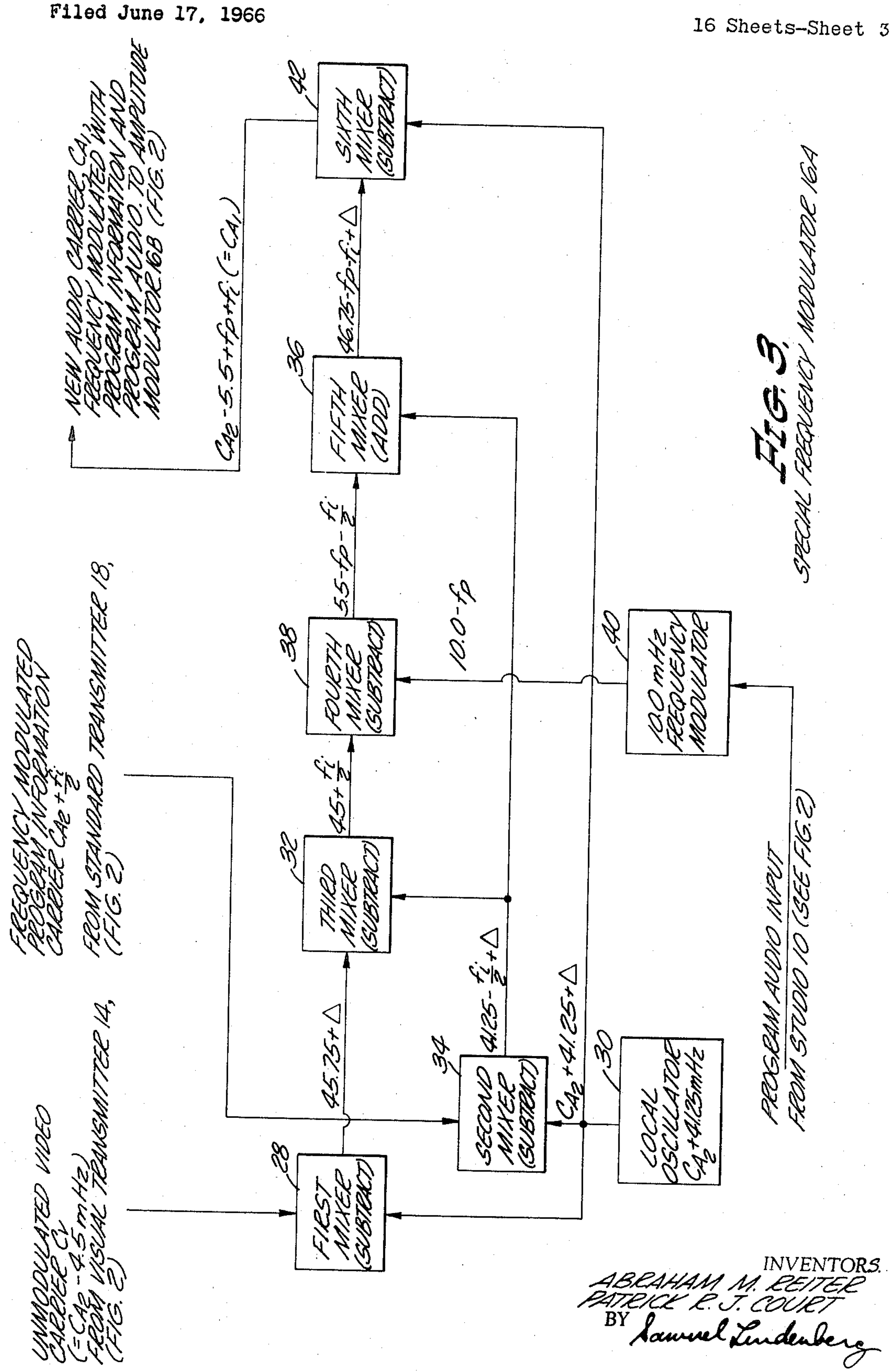
FIG. 3 is a block schematic diagram of a special frequency modulator 16A which is used at the transmitter in this invention.

FIG. 3 is a block diagram of the details of the special frequency modulator 16A. The unmodulated video carrier $C_V$, received from the visual transmitter 14, is applied as a first input to a first mixer 28. Because $C_V$ is 4.5 mHz. below $C_{A2}$, $C_V$ may be expressed as $C_{A2}-4.5$. A second input to mixer 28, which is a subtractive mixer, is the output from a local oscillator 30 whose frequency is chosen as $C_{A2}+41.25$ mHz. This oscillator frequency has a frequency tolerance Δ, so that the output of oscillator 30 may be writen as $C_{A2}+41.25+\Delta$. As the frequency of oscillator 30 may be very high, the magnitude of Δ is significant. The subtractive process performed in the first mixer 28 may therefore be expressed as follows:

$$C_{A2}+41.25+\Delta-(C_{A2}-4.5)=45.75+\Delta$$

where the output of mixer 28 is $45.75+\Delta$, which is applied as a first input to a third subtractive mixer 32.

The frequency modulated program information carrier has been previously defined as $$C_{A2}+\frac{fi}{2}$$

and this signal is applied as a first input to a second mixer 34. The second input to the second mixer 34 which is also a subtractive mixer, is also the output of oscillator 30 which of course is $C_{A2}+41.25+\Delta$. The mixing process which occurs in mixer 34 may be expressed algebraically as follows:

$$C_{A2}+41.25+\Delta-\left(C_{A2}+\frac{fi}{2}\right)=41.25-\frac{fi}{2}+\Delta$$

where $$41.25-\frac{fi}{2}+\Delta$$

is the output of mixer 34 and which is applied as a second input to the third mixer 32. It is also applied as a first input to a fifth mixer 36. The third mixer 32 is also a subtractive mixer and its output is given by:

$$45.75+\Delta-\left(41.25-\frac{fi}{2}+\Delta\right)=4.5+\frac{fi}{2}$$

It will be noted that the frequency tolerance or drift component Δ, which forms part of the two inputs to mixer 32 cancels, so that the output of mixer 32 is a stable 4.5 mHz. frequency, which is frequency modulated with the program information deviation *fi*/2. This signal is applied as a first input to a fourth subtractive mixer 38.

The second input to mixer 38 is the output from a 10.0 mHz. frequency modulator 40, which has as its input the program audio received from the studio 10. Frequency modulator 40 is designed to be very stable and, since the center frequency of its output is relatively low, the magnitude of its frequency tolerance is so small that is may be neglected in the subsequent mixing processes. The deviation of the 10.0 mHz. output of frequency modulator 40 may therefore be defined at 10.0—$f_p$. Fourth mixer 38 is also a subtractive mixer and its output may therefore be expressed algebraically as follows:

$$10.0-fp-\left(4.5+\frac{fi}{2}\right)=5.5-fp-\frac{fi}{2}$$

This signal is a stable center frequency 5.5 mHz. carrier, frequency modulated ±12.5 kHz. with program information audio, and it is applied as a second input to the fifth additive mixer 32. It will be recalled that the first input to mixer 36 is the output from the second mixer 34 which is $$41.25-\frac{fi}{2}+\Delta$$

Mixer 36 is an additive mixer and its output is given algebraically as follows:

$$41.25-\frac{fi}{2}+\Delta+\left(5.5-fp-\frac{fi}{2}\right)=46.75-fp-fi+\Delta$$

The output is thus a 46.75 mHz. carrier which is frequency modulated ±25 kHz. with program audio, ±25 kHz. with program information audio, and also has superimposed upon it the drift component Δ. This signal is applied as a first input to a sixth subtractive mixer 42. The second input to mixer 42 is also the output of local oscillator 30 which, it will be remembered, is $C_{A2}+41.25\mp\Delta$. The sixth mixer 42 is a subtractive mixer and its output is therefore given by $$C_{A2}+41.25+\Delta-(46.75-f_p-fi+\Delta)=C_{A2}-5.5+f_p+fi$$

It should be noted that the drift component Δ, which is present on the two inputs to mixer 42, is cancelled in the output of mixer 42, which output is a carrier 5.5 mHz. below $C_{A2}$ and which is frequency modulated ±25 kHz. with program audio, and ±25 kHz. with program information audio. By previous definition this signal is therefore the new program carrier $C_{A1}$ and forms the output of the special frequency modulator. Referring back to FIG. 2, this signal is delivered to the amplitude modulator 16B where it is amplitude modulated with the composite restoring code and code checking signals.

FIG. 4 is a block diagram of the details of the grey-blank video, restoring and code signal generator 12 represented in FIG. 2. Normal composite video from the studio 10 is applied to a stabilizing amplifier 42, and three outputs are obtained which are: composite video, composite sync, and color bursts (for color transmissions). The stabilizing amplifier 42 is a well known, commercially available piece of equipment, and therefore need not be discussed further.

Figure 4B:
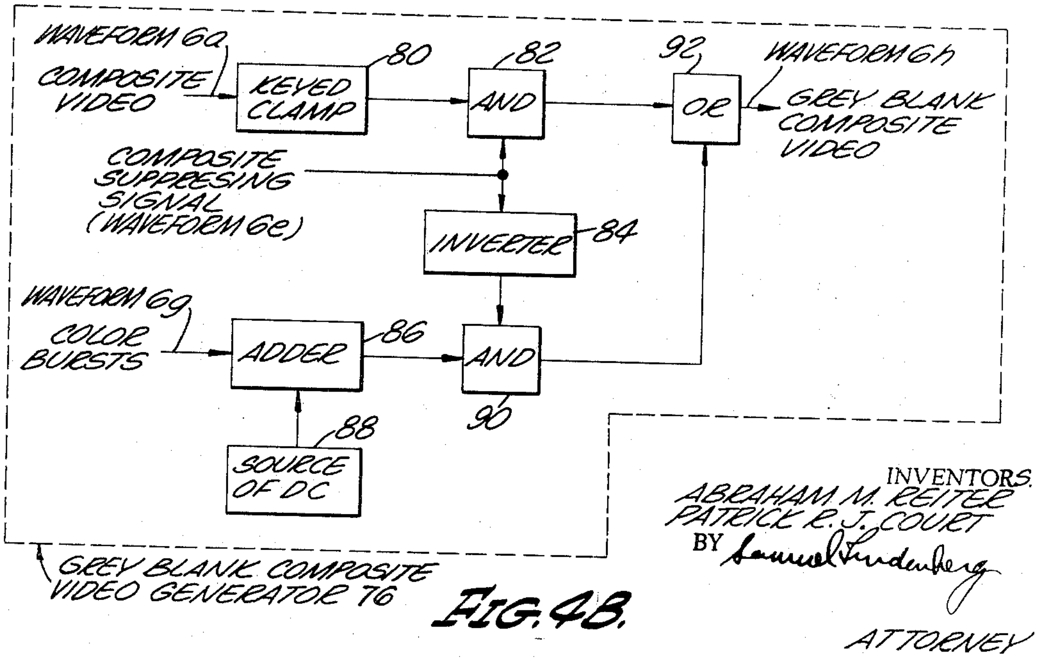
FIG. 4B is a block schematic diagram of the details of the grey-blank composite video generator 76, shown in FIG. 4.
Figure 4A:
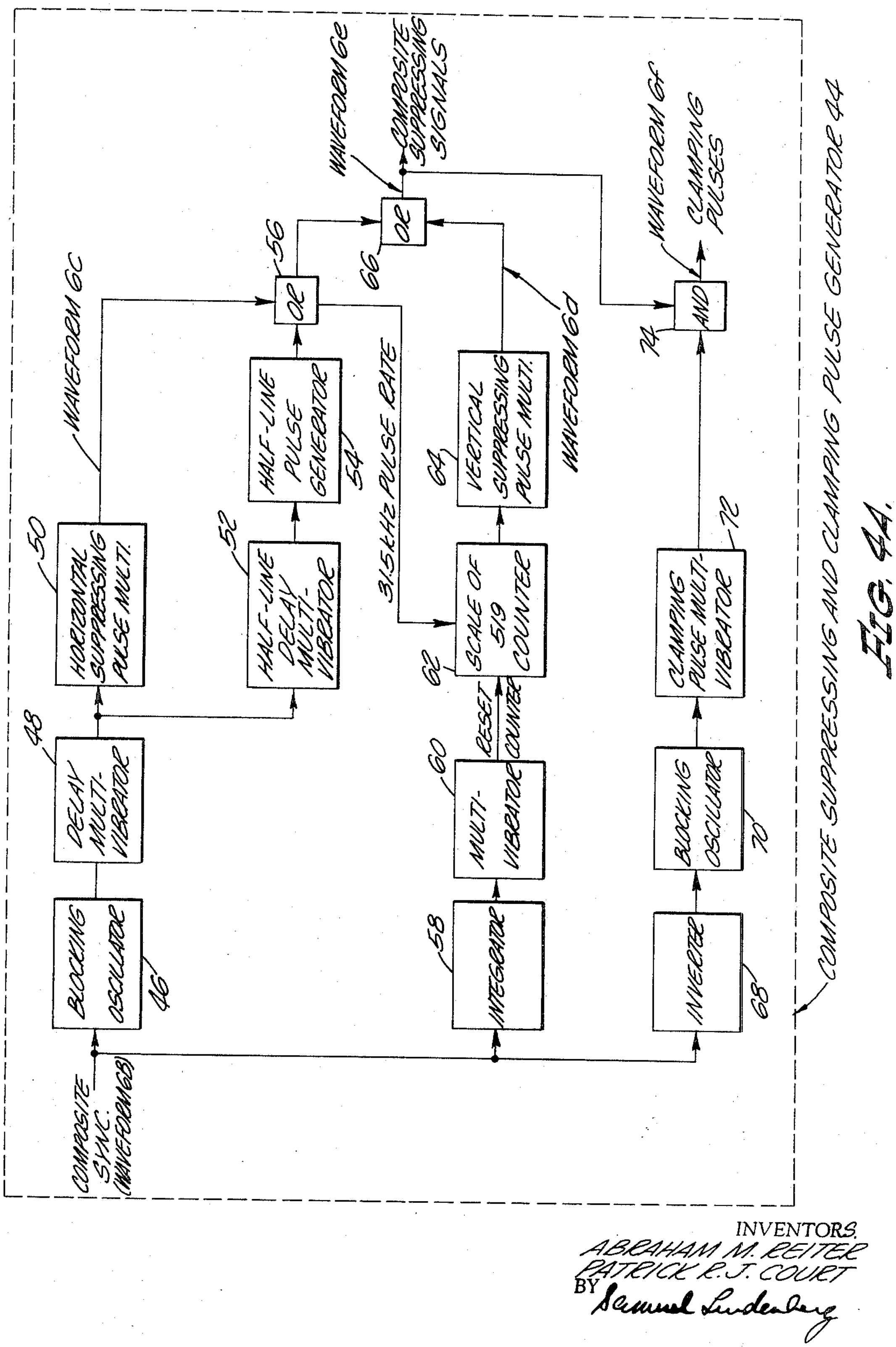
FIG. 4A is a block schematic diagram of the details of a composite suppressing and clamping pulse generator 44, shown in FIG. 4.

Composite sync is applied to a composite suppressing and clamping pulse generator 44, further details of which are shown in FIG. 4A. Two outputs are derived from generator 44: suppressing signals and clamping pulses. The composite suppressing and clamping pulse generator is a combination of multivibrators and gates whose structural operation may readily be understood with reference to the block diagram of FIG. 4A and to the waveforms in FIG. 6. The composite sync is shown as waveform 6B in FIG. 6. A blocking oscillator 46 is synchronized at the horizontal rate by the appropriate positive going edges of composite sync.

The output of the blocking oscillator 46 is applied to a first delay multivibrator 48 which delays the oscillator output for slightly less than a line. The output of the delay multivibrator 48 is then applied to a horizontal suppressing pulse multivibrator 50 which shapes the delay multivibrator output to produce the horizontal suppressing signal pulse signal represented by FIG. 6C.

Half line pulses (one per line) at the line rate are generated by applying delay multivibrator 48 output to half line delay multivibrator 52, which delays the pulses for half a line and applies them to the half line pulse generator 54. The outputs of horizontal suppressing pulse multivibrator 50 and half line pulse generator 54 are applied to an OR gate 56, which combines them to provide two pulses per line as output.

Figure 6:
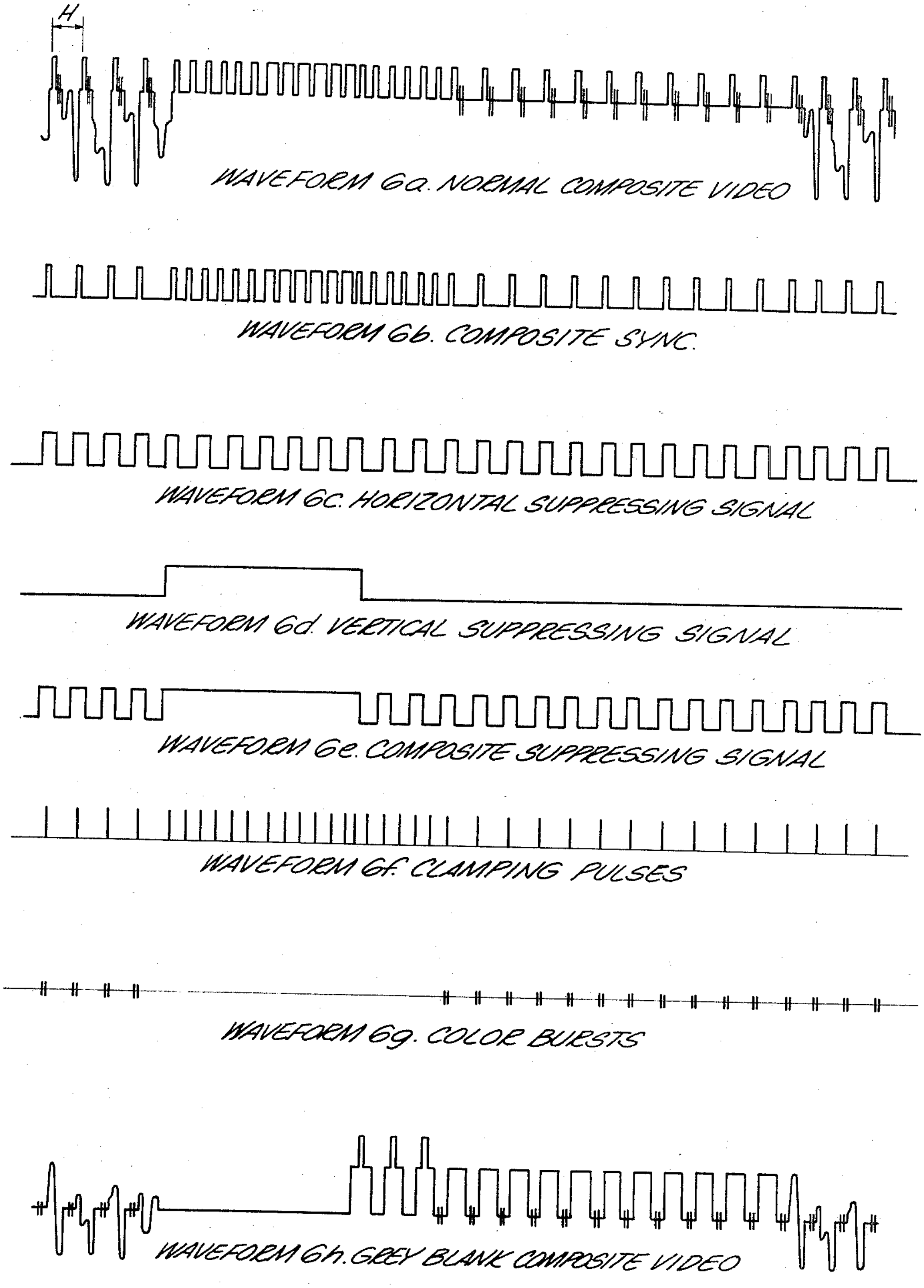

Vertical suppressing pulses, as represented by waveform 6D in FIG. 6, are generated by detecting vertical sync from composite sync, in the usual manner using an integrator 58. This is used to drive a multivibrator 60 whose output at the start of vertical sync resets a 519 counter 62, which is driven to count 519 half lines in response to the 31.5 kHz. pulses received from OR gate 56. At the end of the 519 one-half line count a vertical suppressing multivibrator 64 is driven to provide the output represented by waveform 6D. The output of OR gate 56 and vertical suppressing pulse multivibrator 64 are applied to OR gate 66 which produces a composite suppressing signal, which is represented by waveform 6E.

Clamping pulses are derived from composite sync by applying these signals to an inverter 68 and thereafter driving a blocking oscillator 70, biased to be driven only by the positive going edges of the output of inverter 68. The output of blocking oscillator 70 drives a clamping pulse multivibrator 72. The output of this multivibrator 72 gates an AND gate 74 to which the composite suppressing signals received from OR gate 66 are applied. The resultant output of AND gate 74 is the clamping pulses shown in waveform 6F.

Referring back to FIG. 4, a grey-blank composite video generator 76 is provided with the composite video output of the stabilizing amplifier 42. A second input to the generator 76 is the composite suppressing signal from the generator 44. For color transmissions, a color burst input from the stabilizing amplifier 42 is also provided. As shown in FIG. 4B, the grey-blank composite video generator is basically a switch, which switches between normal composite video and a fixed DC reference, in response to suppressing signals. The fixed DC reference is the grey blank level. For color transmissions, the color bursts are superimposed on the fixed DC reference.

As shown in FIG. 4B, the composite video (waveform 6A) is applied to a keyed clamping circuit 80 the output of which is applied to an AND gate 82. This is gated by the composite suppressing signals (waveform 6E) which are also applied to an inverter 84. If color is being transmitted, the color burst signals (waveform 6G) are superimposed by an adder 86, on a DC reference signal provided by a bias source 88. The adder output is applied to the AND gate 90. An OR gate 92 receives the output of AND gates 82 and 90 and provides as its output the grey-blank composite video, which is waveform 6H. This is a video signal wherein both blank and sync are in the grey area.

The grey-blank composite video is amplitude modulated on the $C_V$ carrier in the video transmitter 14, shown in FIG. 2. The clamping pulses from generator 44 are also supplied to the video transmitter because it is not possible to derive clamping pulses in the usual way from grey-blank composite video.

Figure 4C:
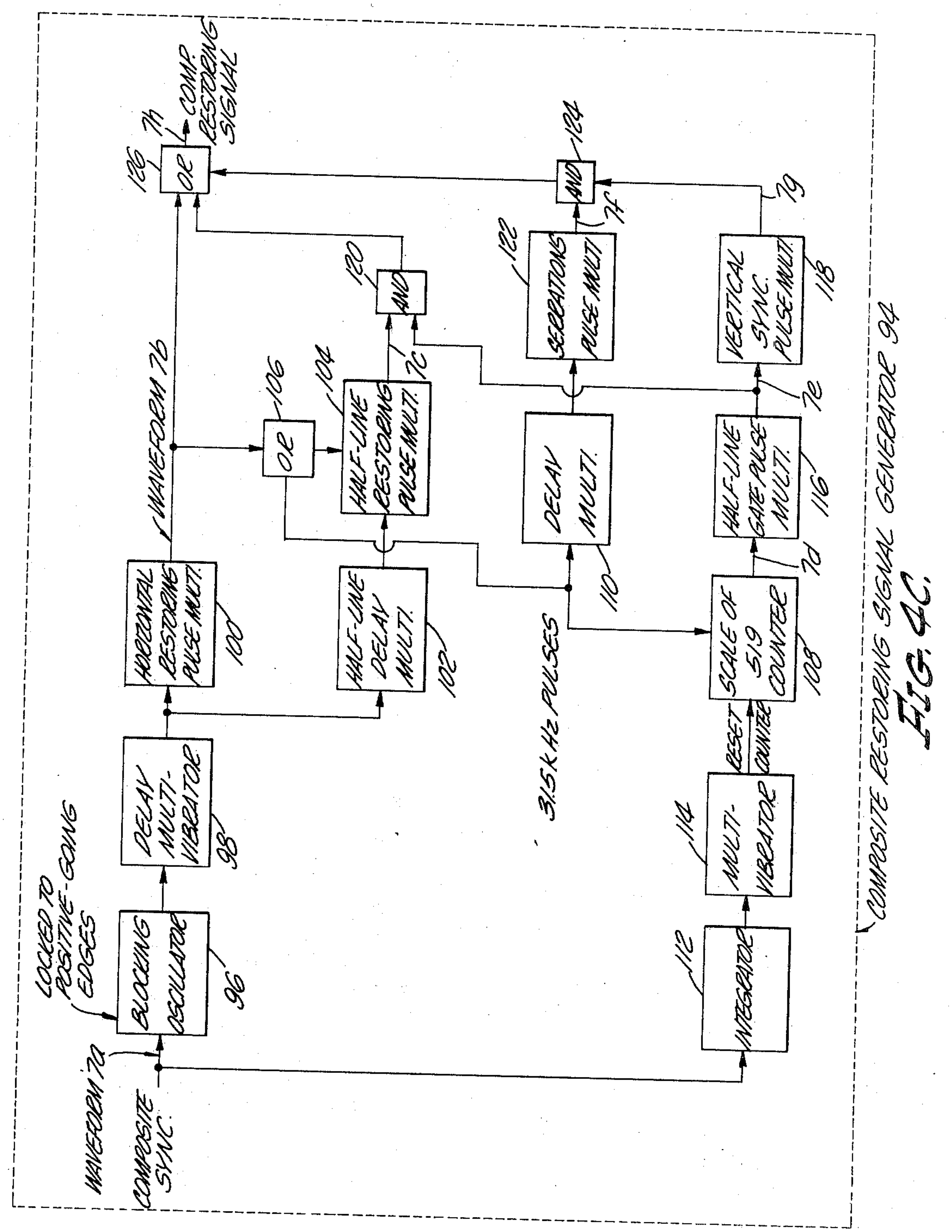
FIG. 4C is a block schematic diagram of the details of the composite restoring signal generator 94, shown in FIG. 4.
Figure 7:
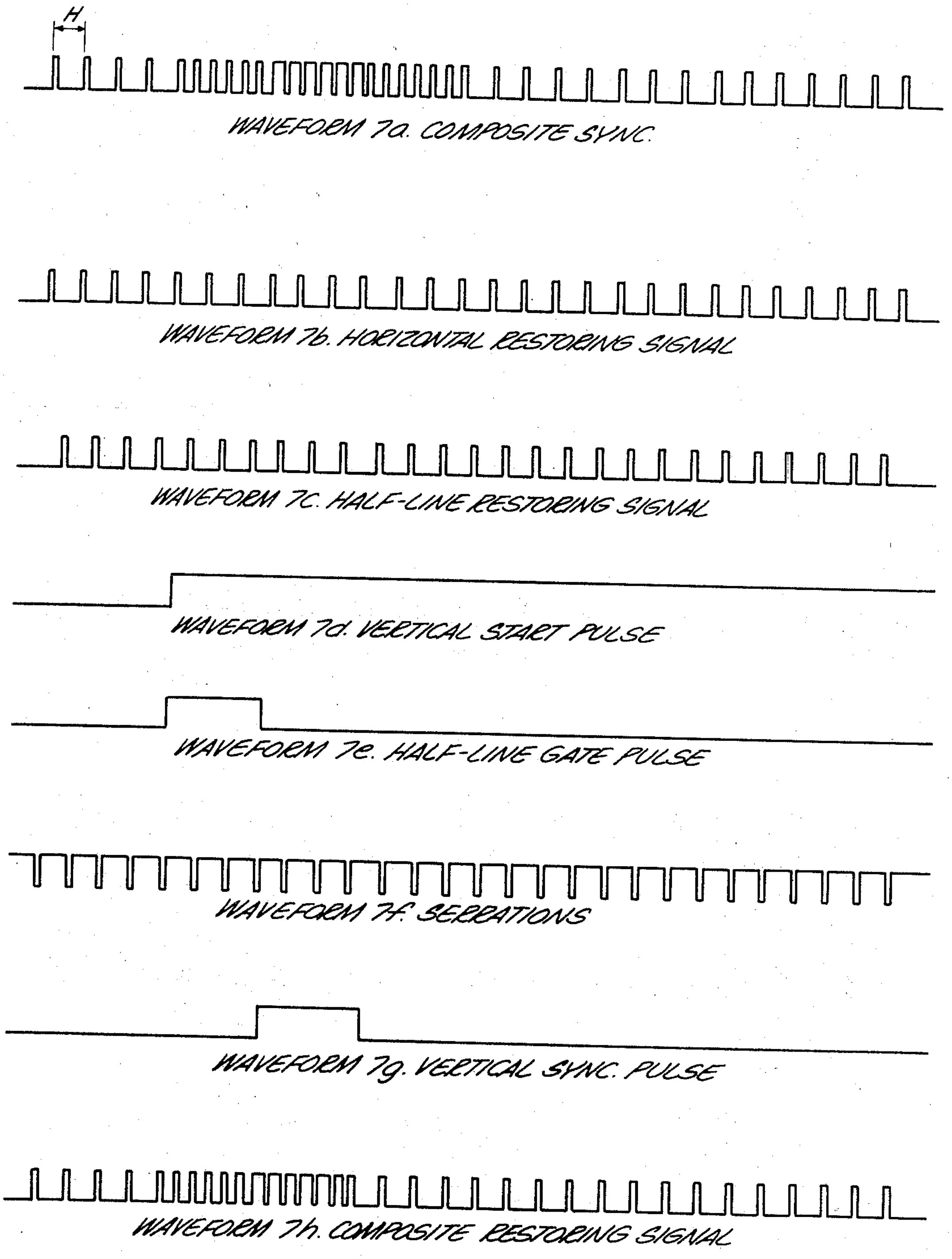

Referring back to FIG. 4, a composite restoring signal generator 94, shown in detail in FIG. 4C, has, for its input, composite sync from the stabilizing amplifier 42. From these signals it generates the composite restoring signal shown in FIG. 7H. Additional waveforms are shown in FIG. 7 to aid in understanding how the composite signal is derived.

Referring to FIG. 4C, there may be seen a block diagram of the details of the composite restoring signal generator. A blocking oscillator 96 responds to the positive going edges of the composite sync signals (FIG. 7A). A one line delay multivibrator 98 receives the output of oscillator 96, and applies its output to a horizontal restoring pulse multivibrator 100 producing an output represented by waveform 7B. Multivibrator 98 output is delayed by a half line by half line delay multivibrator 102, the output of which is shaped by a half line restoring pulse multivibrator 104 (waveform 7C). Its output together with the output of horizontal restoring pulse multivibrator 100 are applied to an OR gate 106 to produce 31.5 kHz. pulses as output, which are used to drive a scale of 519 counter 108 and also a delay multivibrator 110.

The start or reset signal for the counter 108 is derived, as before, by detecting vertical sync, using an integrator 112, from composite sync. This triggers a multivibrator 114, whose output resets the counter 108. The counter output provides a vertical start pulse such as shown in waveform 7D, having a duration of 519 half lines. A half-line gate pulse (waveform 7E), is provided by using the counter output to trigger the half-line gate pulse multivibrator 116, whose output, as represented by waveform 7E, has three horizontal lines duration. The pulse is used to trigger a vertical sync pulse multivibrator 118 providing a vertical sync pulse (waveform 7G) of three horizontal line duration. This pulse also gates an AND gate 120 to let through half line restoring pulses (7C) from the multivibrator 104, whose output is also applied to AND gate 120.

The delay multivibrator 110 drives a serrations pulse multivibrator 122 which produces the serration pulse represented by waveform 7F. This output is applied to AND gate 124 which passes these pulses over the interval of the vertical sync pulse (waveform 7G). The output of AND gate 124, AND gate 120 and horizontal restoring pulse multivibrator 100 are all applied to OR gate 126 which provides composite restoring signals (waveform 7H) as output.

The composite restoring signal is a combination of three signals. The first signal is the horizontal restoring pulse waveform 7B. The second signal is the combination of half line restoring signals that have been enabled by the half line gate pulses. The third signal is serrated vertical sync obtained by gating vertical sync 7G, and serrations 7F.

Figure 5:
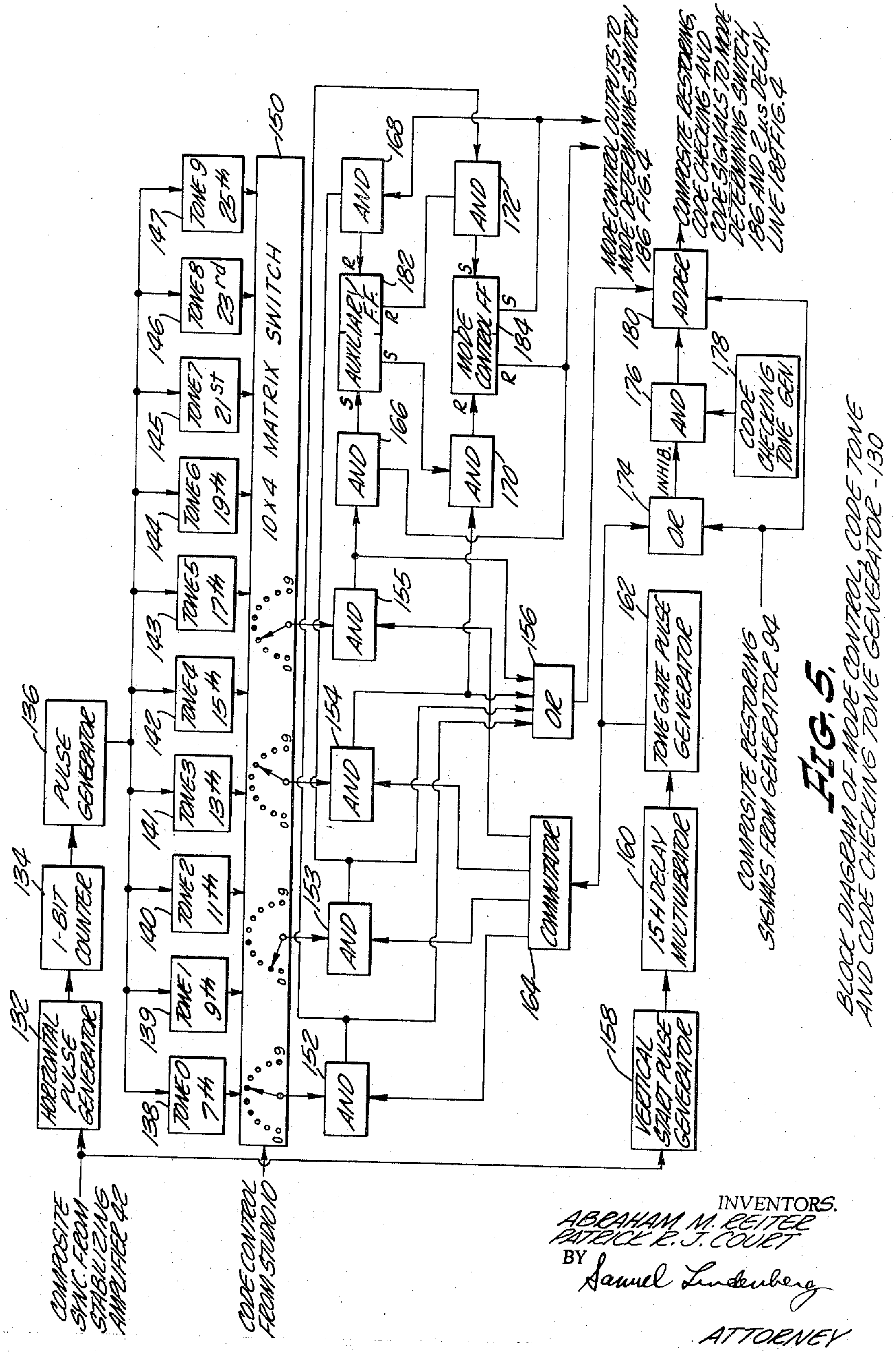
FIG. 5 is a block schematic drawing of the details of the mode control, code tone and code checking generator 130, shown in FIG. 4.

Referring back to FIG. 4, a mode control, code tone and code checking tone generator 130 receives the output of the generator 94, composite sync and code control signals from the studio 10. The details of generator 130 are shown in FIG. 5, to which attention is now directed. The code tone generating part comprises a horizontal pulse generator 132, one bit counter 134, pulse generator 136, 7th through 25th harmonic generators 138 through 147, matrix switch 150, AND gates 152 through 155 and OR gate 156. Horizontal pulse generator 132 may simply be a 15.750 kHz. blocking oscillator which is synchronized by the horizontal pulse components of the composite sync input from stabilizing amplifier 42 in FIG. 4. One bit counter 134 receives the 15.750 kHz. output from generator 132 and generates a 7.875 kHz. square wave therefrom, which is used by pulse generator 136 to form a 7.875 kHz. pulse train. 7.875 kHz. is of course one half of the horizontal scanning frequency. Pulse generator 136 simultaneously drives the ten harmonic generators

138 through 147 which respectively generate the 7th through the 25th odd harmonics of one-half of the horizontal scanning frequency. These are the code tone frequencies, and are defined as code tones "0" through "9" respectively. The ten continuous code tone inputs from generators 138 through 147 are applied as inputs to a 10 x 4 matrix switch 150. Matrix switch 150 can select any four of its ten code tone inputs and deliver these as individual outputs to four AND gates 152 through 155. Matrix switch 150 may be four manually operable rotary selector switches each having ten input terminals connected to the ten generators and four outputs from the four selectors. These select the desired four tones. Alternatively, a punched card and feeler switches may be used. The matrix may also be remotely operated by well known techniques using solenoids or electronically operated switches which are selectively closed from a distant studio, for example.

The four selected code tone frequencies correspond to an assigned code number for a particular transmission. If, for example, the first selected code tone frequency is tone "3," the second "5," the third "8," and the fourth "0," then the assigned code number is 3580.

A tone gate signal is generated by the structural combination of a vertical start pulse generator 158 driving an 15H delay multivibrator 160 (15 horizontal lines) which drives a tone gate pulse generator 162. Vertical start pulse generator 158 has for its input composite sync, derived from stabilizing amplifier 42 in FIG. 4, and it recognizes the vertical sync component therein by means of well known integration techniques as shown in FIG. 4C, and generates a vertical start pulse which is applied to the 15H delay multivibrator 160. Multivibrator 160 produces a square wave signal, the leading edge of each cycle of which is delayed until the beginning of the fifteenth line of the vertical sync and blanking interval. The trailing edges are used by tone gate pulse generator 162 as a reference for developing a tone gate pulse waveform, shown in FIG. 8B, consisting of pulses, three horizontal lines in width, which straddle the 18th, 19th and 29th lines of vertical blanking. These pulses are applied as an input to an electronic commutator 164 and to an OR gate 174.

The commutator 164, which consists of four sequentially enabled gates, applies the tone gate pulse output from generator 162 sequentially to the four AND gates 152, 155, 154 and 153 enabling each in turn. Each gate, when enabled, will therefore have an output comprising a burst of the code tone frequency present at its input, which has a duration corresponding to the 18th, 19th and 20th lines of vertical blanking. The cycling of commutator 164 may be such as to create a random or pseudo random sequencing of the code tone outputs from the four AND gates 152 through 155, which are routed to four AND gates 166, 168, 170 and 172, and also to an OR gate 156. The OR gate 156 combines the four randomly sequenced code tone bursts and applies them as a first input to adder 180.

Figure 8:
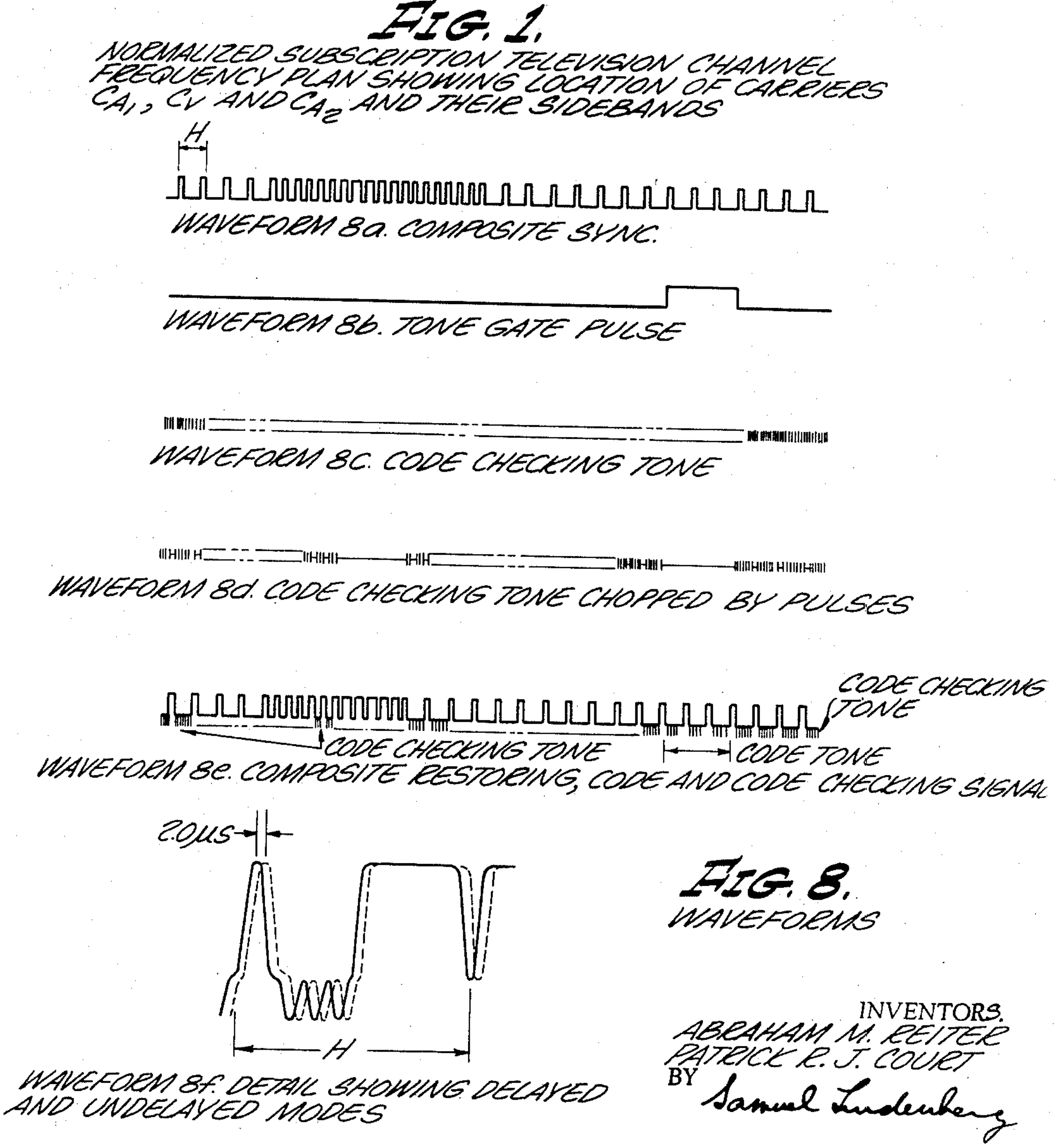
FIGS. 6, 7 and 8 are waveforms of signals which are generated at the various generators, which are shown to assist in an understanding of the invention.

The tone gate pulses (waveform 8B) form a first input to an OR gate 174. A second input is the composite restoring signal (waveform 7H), from generator 94 in FIG. 4. These are combined in OR gate 174 to form an inhibiting signal input to an AND gate 176. Also applied to AND gate 176 is the code checking tone signal shown in FIG. 8C which is generated by a code checking tone generator 178. The generator 178 is a very stable oscillator whose frequency is ten times the horizontal scanning frequency that is specified for color transmissions. The output of AND gate 176 is therefore the code checking tone that is chopped by the combination of composite restoring and tone gate signals, and is illustrated in FIG. 8D. This signal forms a second input to an adder 180. The first input to adder 180, it will be remembered, are the four randomly cycled code tone bursts from OR gate 156. A third input to adder 180 is the composite restoring signal (waveform 7H) from generator 94 in FIG. 4. Adder 180 combines all three inputs to form the composite restoring, code and code checking signal shown in FIG. 8E.

It will be noted that the composite restoring pulse portion of the waveform in FIG. 8E is very characteristic of, but not exactly identical to, normal composite sync (shown in FIG. 8A). As will be later shown, it is used in a decoder for restoring the synchronizing information (and blanking information) which is absent from the grey-blank composite video (shown in FIG. 6H).

The mode control section of generator 130, shown in detail in FIG. 5, comprises an auxiliary flip-flop 182 and a mode control flip-flop 184, and their associated AND gates 166, 168, 170 and 172. It was mentioned previously that the four randomly sequenced code tone burst outputs from gates 152 through 155 are applied as separate inputs to gates 166, 168, 170 and 172. The mode control flip-flop 184 is set and reset by tones from AND gates 152 and 154 respectively, enabled at AND gates 172 and 170 by the outputs of the auxiliary flip-flop 182. The auxiliary flip-flop is set and reset by tones from AND gates 155 and 153 respectively, enabled at AND gates 166 and 168 by the outputs of the mode control flip-flop 184.

The operation of the mode control logic may be understood if a particular tone sequence is assumed to occur. Suppose that flip-flop 182 is set and flip-flop 184 is reset and control tone bursts are received from gates 152 through 155 in four successive fields. On the first field, a tone comes from gate 152 and is applied to gate 172. As auxiliary flip-flop 182 is assumed to be set, gate 172 is enabled and mode control flip-flop 184 will therefore be set, which now enables gate 166. On the second field, a tone comes from gate 155 and is applied to the previously enabled gate 166. This does not affect the now set auxiliary flip-flop 182, enabling gate 170. On the third field a tone comes from gate 154 and is applied to gate 170, which being previously enabled, causes the mode control flip-flop to be reset, thereby enabling gate 168. On the fourth field, a tone from gate 153 enables gate 168 and resets the auxiliary flip-flop 182.

It is clear that neither flip-flop can be either set or reset by a tone, unless the particular gate associated with the tone input has been previously enabled. In view of the random cycling of the four code tones at the inputs of the four gates 166, 168, 170 and 172, the switching of both flip-flops 182 and 184 will follow a random and unpredictable pattern, dependent upon the particular cycling of the commutator 164. However, switching, when it occurs, can only occur during any code tone interval, which it will be remembered, is confined to a three-line interval commencing with the 18th line following the start of vertical blanking. One of the two flip-flops is assigned the role of controlling a mode determining switch 186 in FIG. 4, and this is the mode control flip-flop 184. The mode determining switch is a two input single output switch which is controlled to provide as output one or the other of its inputs by the mode control flip-flop.

The composite restoring, code and code checking signal from the adder 180 is applied to a 2-microsecond delay line 188 in FIG. 4. The delayed signals from delay line 188 are applied to the mode determining switch 186. A second input to the mode determining switch 186 is the same signal, undelayed, from the adder 180 in FIG. 5. The mode determining switch therefore has, for its output, either the delayed or the undelayed signals, as controlled by the outputs from the mode control flip-flop 184 in FIG. 5. The output from the mode determining switch 186 is thus the composite restoring, code and code checking signal waveform 8E, either undelayed or delayed by 2 microseconds. The comparison is shown in FIG. 8F.

The delayed and undelayed modes of transmission of this waveform are therefore interchanged randomly and abruptly at times which are determined by the mode control flip-flop 184 and its associated logic, through the agency of the four randomly sequenced code tones. As will be shown later, these same code tones, which of course form a part of the composite waveform 8E, are ultimately used in a decoder to correctly operate a mode selection apparatus to enable correct decoding of picture and sound.

The composite restoring, code and code checking signal output from mode determining switch 186 is applied to the amplitude modulator 16B in FIG. 2 where it is amplitude modulated upon the program audio carrier $C_{A1}$.

Consideration will now be given to the decoder attachment whose purpose is to receive the encoded transmissions which have been described above, to decode them in response to appropriate actions by the subscriber and to render them in a form which is intelligible to the subscriber's television receiver. The latter is of course assumed to be a normal, standard receiver, either color or monochrome.

Figure 1:
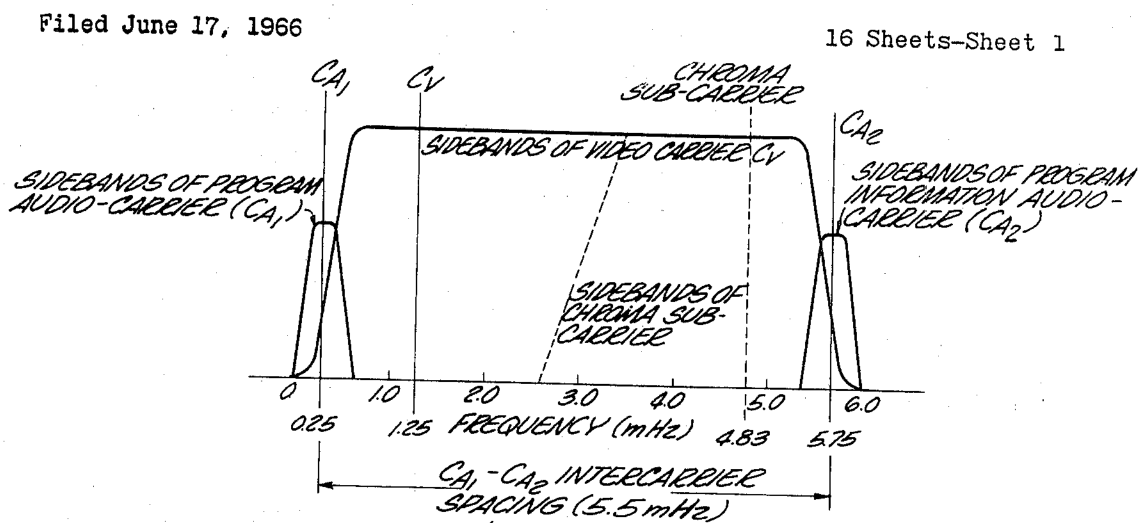
FIG. 1 is a drawing of the normalized subscription television channel frequency plan in accordance with this invention, showing the location of various carriers which are used and their sidebands.
Figure 9:
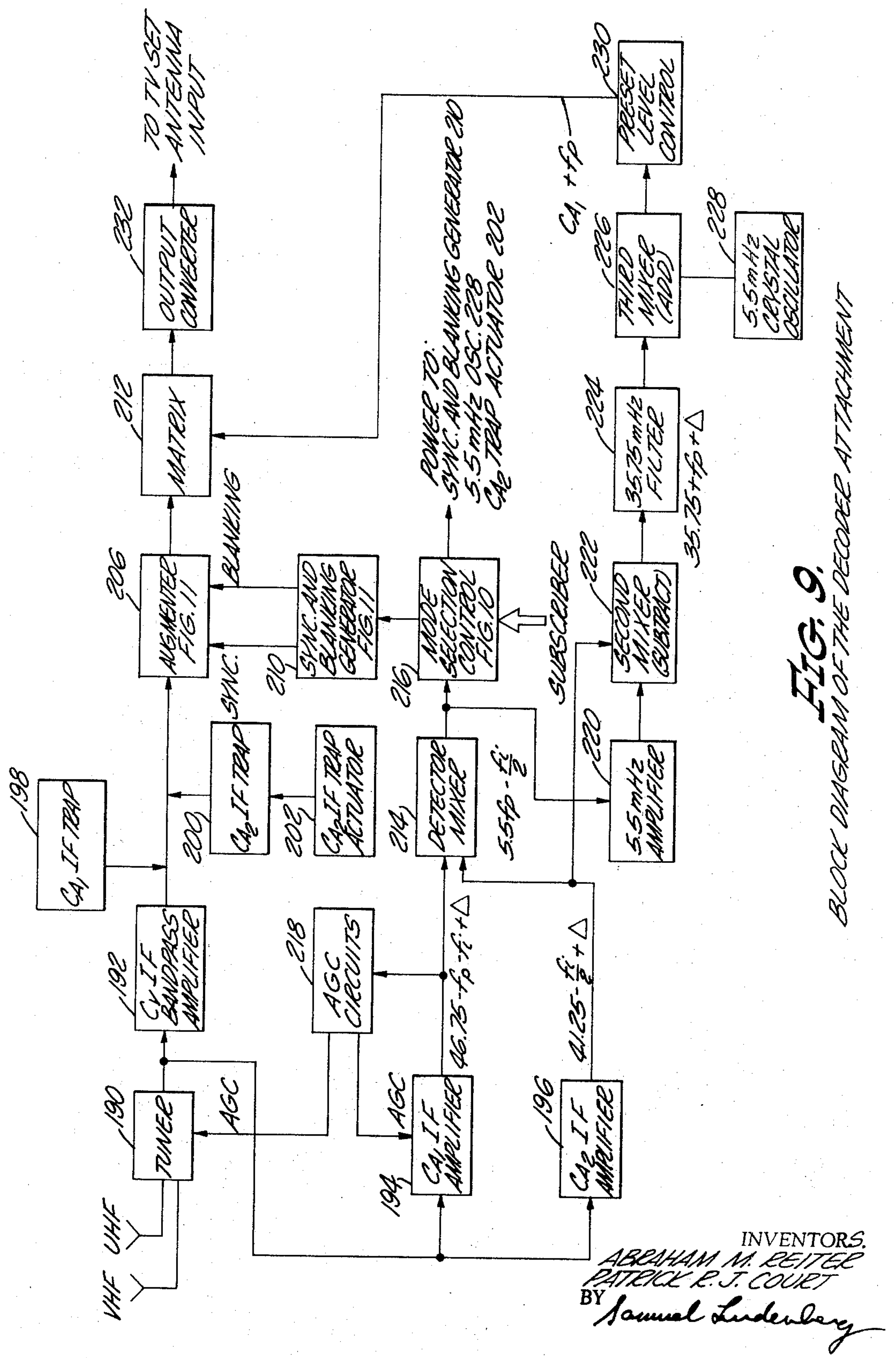
FIG. 9 is a block schematic diagram of an attachment used at a subscriber receiver for decoding the signals received from the transmitter.

FIG. 9 shows a block diagram of the decoder attachment. It is equipped with a tuner 190, which may be designed for either VHF reception or UHF reception, or both. Tuner 190 converts all three received carriers $C_{A1}$, $C_V$ and $C_{A2}$ to their respective intermediate frequencies. Because tuner 190 is a standard tuner, with a "high-side" oscillator, the converted channel is inverted with respect to the received channel which was shown in FIG. 1. The instantaneous deviations as specified for the transmitted $C_{A1}$ and $C_{A2}$ carriers are also reversed and for the purpose of the subsequent analysis are shown to have a negative sign. Because the local oscillator in tuner 190 has a frequency tolerance or drift component $\pm\Delta$, this tolerance is also transferred to the converted carriers. The converted carrier outputs from tuner 190 may therefore be specified at any instant as follows:

$$C_{A1}\ (\mathrm{IF})=46.75\ \mathrm{mHz.}-fp-fi+\Delta$$
$$C_V\ (\mathrm{IF})=45.75\ \mathrm{mHz.}+\Delta$$
$$C_{A2}\ (\mathrm{IF})=41.25\ \mathrm{mHz.}-fi/2+\Delta.$$

The output of tuner 190 is split three ways, to feed a $C_V$ IF bandpass amplifier 192, a $C_{A1}$ IF amplifier 194, and a $C_{A2}$ IF amplifier 196.

$C_V$ IF bandpass amplifier 192 accepts the 45.75 mHz. IF video carrier and its sidebands and provides some attenuation to the 41.25 mHz. and 46.75 mHz. IF audio carriers. A $C_{A1}$ trap 198 tuned to 46.75 mHz., effectively removes the $C_{A1}$ IF carrier from the output of the $C_V$ bandpass amplifier 192 while a $C_{A2}$ IF trap 200, in response to a trap actuator 202 can effectively remove the $C_{A2}$ IF carrier from the output of bandpass amplifier 192. The $C_{A2}$ IF trap actuator 202 may simply be a diode, which, when biased with a DC voltage, effectively short circuits the $C_{A2}$ IF trap 200, to disable it.

Thus, when the $C_{A2}$ IF trap 200 is not disabled, the input to augmenter circuit 206 consists only of the $C_V$ IF carrier, modulated with the grey-blank video waveform shown in FIG. 6H. From a frequency viewpoint, this carrier has already been defined as 45.75+Δ. The operation of augmenter 206 will be discussed more fully below. For the moment it will suffice to state that, in response to separate sync and blanking inputs from sync and blanking generator 210, the grey-blank video IF carrier is restored to what is essentially a normal composite video IF carrier, and this carrier forms one input to a matrix circuit 212.

The $C_{A1}$ IF amplifier 194 is a narrow band amplifier, tuned to 46.75 mHz., and this amplifier rejects the $C_{A2}$ and $C_V$ IF carriers which are present at its input. Amplifier 194 has a relatively high gain so that a following detector 214 may effectively demodulate the amplitude modulation upon the $C_{A1}$ IF carrier which, it will be recalled, is the composite restoring, code and code checking signal shown in FIG. 8E. The demodulated composite restoring, code and code checking signal is delivered to a mode selection control unit 216 whose operation will be considered in more detail below. The output of amplifier 194 also drives the AGC circuits 218 which in turn furnish AGC voltages for controlling the gain of tuner 190 and of the $C_{A1}$ IF amplifier 194 itself.

The $C_{A2}$ IF amplifier 196, which is tuned to 41.25 mHz., rejects the other two IF carriers $C_V$ and $C_{A1}$ at its input, and amplifies only the $C_{A2}$ IF carrier before it is applied as a second input to detector 214. This signal has already been defined as $$41.25-\frac{fi}{2}+\Delta$$

$C_{A2}$ IF amplifier 196 has a relatively low gain in comparison with that of $C_{A1}$ IF amplifier 194, and the maximum level of the $C_{A2}$ IF carrier applied to detector 214 is therefore contrived to be always less than the minimum amplitude of the amplitude modulated $C_{A1}$ IF carrier, which is also applied to detector 214.

Detector 214, being a highly nonlinear device, also acts as a mixer for the $C_{A1}$ and $C_{A2}$ IF carrier inputs. It is desired that the difference frequency be chosen as the output of the detector 214 and so it is designed to operate as a subtractive mixer. The mixing process in detector mixer 214 may be expressed algebraically as follows:

$$46.75-fp-fi+\Delta-\left(41.25-\frac{fi}{2}+\Delta\right)=5.5-fp-\frac{fi}{2}.$$

This is a 5.5 mHz. signal, with no drift component $\Delta$, due to the tuner, and which is modulated ±25 kHz. with program audio and is also modulated ±12.5 kHz. with information audio. It is selected and amplified by a 5.5 mHz. amplifier 220 before being applied as a first input to a second mixer 222.

Because the relative amplitudes of the two IF carrier inputs to detector mixer 214 were carefully chosen as stated above, a well known property of mixers is obtained in which the level of the output is principally dependent upon the level of the smaller input, and is substantially independent of the level of the larger input. The larger input, it will be recalled, was the amplitude modulated $C_{A1}$ IF carrier. The 5.5 mHz. output of amplifier 220 is therefore substantially free of amplitude modulation but its level varies sympathetically with the level variations of the $C_{A2}$ IF carrier output from amplifier 196.

The $C_{A2}$ IF carrier output from amplifier 196 is also applied as a second input to second mixer 222, which is arranged to be a subtractive mixer. The relative signal level outputs of 5.5 mHz. amplifier 220 and $C_{A2}$ IF amplifier 196 are such that the first input to mixer 222, which was shown to be $$5.5-fp-\frac{fi}{2}$$

is larger than the second input which of course is $$41.25-\frac{fi}{2}+\Delta$$

Algebraically, the mixing process in mixer 222 may be written:

$$41.25-\frac{fi}{2}+\Delta-\left(5.5-fp-\frac{fi}{2}\right)=35.75+fp+\Delta$$

The output is thus a 35.75 mHz. carrier which is frequency modulated ±25 kHz., with only program audio (the program information deviation is cancelled in mixer 222) and which has a tuner drift component $+\Delta$.

Because the 5.5 mHz. input to mixer 222 is the larger signal, the 35.75 mHz. output is substantially independent of the level variations of this signal and moreover is independent of any small residual amplitude modulation which was not eliminated in the detector mixer 214. Thus the 35.75 mHz. carrier output from second mixer 222 is now completely free of AM due to the original amplitude modulation of the $C_{A1}$ IF carrier. The level of the 35.75 mHz. carrier depends almost entirely upon the level of the 41.25 mHz. input to second mixer 222. The output of second mixer 222 is selected by a 35.75 mHz. filter 224 and applied as a first input to a third mixer 226. The second input to third mixer 226 is the output of a 5.5 mHz. crystal controlled oscillator 228, and is arranged to be the larger input to third mixer 226. Third mixer 226 is an additive mixer and the mixing process can be written:

$$35.75+fp+\Delta+5.5=41.25+fp+\Delta$$

The output is thus a 41.25 mHz. carrier, frequency modulated ±25 kHz. with program audio and which has a tuner drift component $+\Delta$. The frequency tolerance of the crystal controlled oscillator 228 is so small that it may be neglected.

As the 5.5 mHz. oscillator signal input to third mixer 226 is the larger of the two and is of constant amplitude, the signal level output is dependent only upon the signal level of the 35.75 mHz. input.

It is evident that the output of third mixer 226, being a 41.25 mHz. carrier, frequency modulated with program audio and having a tuner drift component $+\Delta$, is suitable for matrixing with the restored video IF carrier $C_V$, which, it will be recalled, was shown to be 45.75 mHz. and also with a tuner drift component $+\Delta$, and which was applied as a first input to matrix 212. 41.25 mHz. is the appropriate intermediate frequency of a normal audio carrier, and when matrixed with the restored video IF carrier at 45.75 mHz., the two together constitute a normal IF television channel. The two carriers are therefore combined in matrix circuit 212, the 41.25 mHz. carrier being applied as a second input to matrix circuit 212 through a preset level control 230. The purpose of level control 230 is to permit the level of the 41.25 mHz. FM audio IF carrier to be adjusted to the proper amplitude in relation to the amplitude of the 45.75 mHz. AM video IF carrier.

The two carriers are finally converted, by means of output converter 232, to their proper positions in an unused standard television channel, before being delivered to the antenna terminals of the subscriber's television receiver. The subscriber's receiver can then process these signals in the same manner as it does any standard broadcast signals.

It has been shown that by properly proportioning the signal inputs to the various mixers in the audio signal decoding chain, not only is the decoded audio carrier rendered free of the amplitude modulation upon the $C_{A1}$ IF carrier, but the level of the decoded audio carrier output from third mixer 226 is proportional to the $C_{A2}$ IF output from tuner 190. Furthermore, the level of the IF video carrier $C_V$ at the input to matrix 212 is proportional to the level of $C_V$ at the output of tuner 190, because no AGC control is experienced by $C_V$ between these two points. Both the $C_V$ and $C_{A2}$ IF carriers experience the same AGC control in tuner 190 and so the amplitude ratio of those two carriers, as seen by tuner 190 at its input, is maintained as its output. The AGC can only partially compensate for signal strength variations at the tuner input, and some residual variation in the absolute level of the $C_V$ and $C_{A2}$ IF carrier outputs from tuner 190 will occur. However, the relative levels of the $C_V$ IF carrier output from augmenter 206 and the decoded audio IF carrier output from third mixer 226 will not change, regardless of the absolute levels. Thus, once the proper amplitude ratio of the IF carrier inputs to matrix 212 has been established by preset level control 230, this amplitude ratio will be maintained, regardless of the strength of the signals received by tuner 190. This amplitude ratio is not altered by output converter 232 and so the decoded and converted video and audio carriers, which are presented to the antenna terminals of the subscriber's receiver, while they may vary in absolute magnitude with received signal strength, are held to their proper relative levels, which of course are the same as the relative levels of the video and normal audio carriers, $C_V$ and $C_{A2}$, received by tuner 190. Thus the decoding circuits, while decoding the audio and video, without demodulation of either one, not only preserve the proper intercarriers frequency relationship of the decoded carriers, regardless of tuner drift, but preserve their proper amplitude relationship, regardless of received signal strength. Furthermore, the decoded audio carrier is free of the amplitude modulation of the encoded audio carrier.

The application of power to the 5.5 mHz. crystal controlled oscillator 228, to the sync and blanking generator 210 and to the $C_{A2}$ IF trap actuator 202 is controlled by the mode selection control unit 216 which in turn is responsive to appropriate actions by the subscriber. Specifically, before the subscriber signifies his willingness to purchase a subscription television program, power is denied to the 5.5 mHz. crystal oscillator and to the sync and blanking generator, but it is furnished to the $C_{A2}$ IF trap actuator. As a result there will be no sync and blanking inputs to augmenter 206 and the encoded IF video carrier input to the matrix circuit 212 will remain encoded. There will also be no 5.5 mHz. signal input to third mixer 226 and there will therefore be no 41.25 mHz. decoded audio IF carrier input to matrix circuit 212. The $C_{A2}$ IF trap actuator 202 is enabled and thus can disable the $C_{A2}$ trap 200 and the $C_{A2}$ IF carrier, which carries program information, will be admitted to matrix circuit 212. Thus, before the subscriber signifies his willingness to pay, the IF carriers which are converted into the television receiver antenna terminals by converter 232 are the encoded video carrier and the program information carrier. When the subscriber does pay or signify his willingness to pay, the power supplied by the mode selection control unit 216 activates the 5.5 mHz. oscillator 228 and the sync and blanking generator 210, and enables the trap 200, through actuator 202. This causes the decoded program audio IF carrier to be substituted for the program information audio IF carrier in the matrix circuit 212 and the video IF carrier is decoded by augmenter 206. The subscriber is now able to enjoy the program, which is, of course, converted for use by his television receiver by converter 232.

Figure 10:
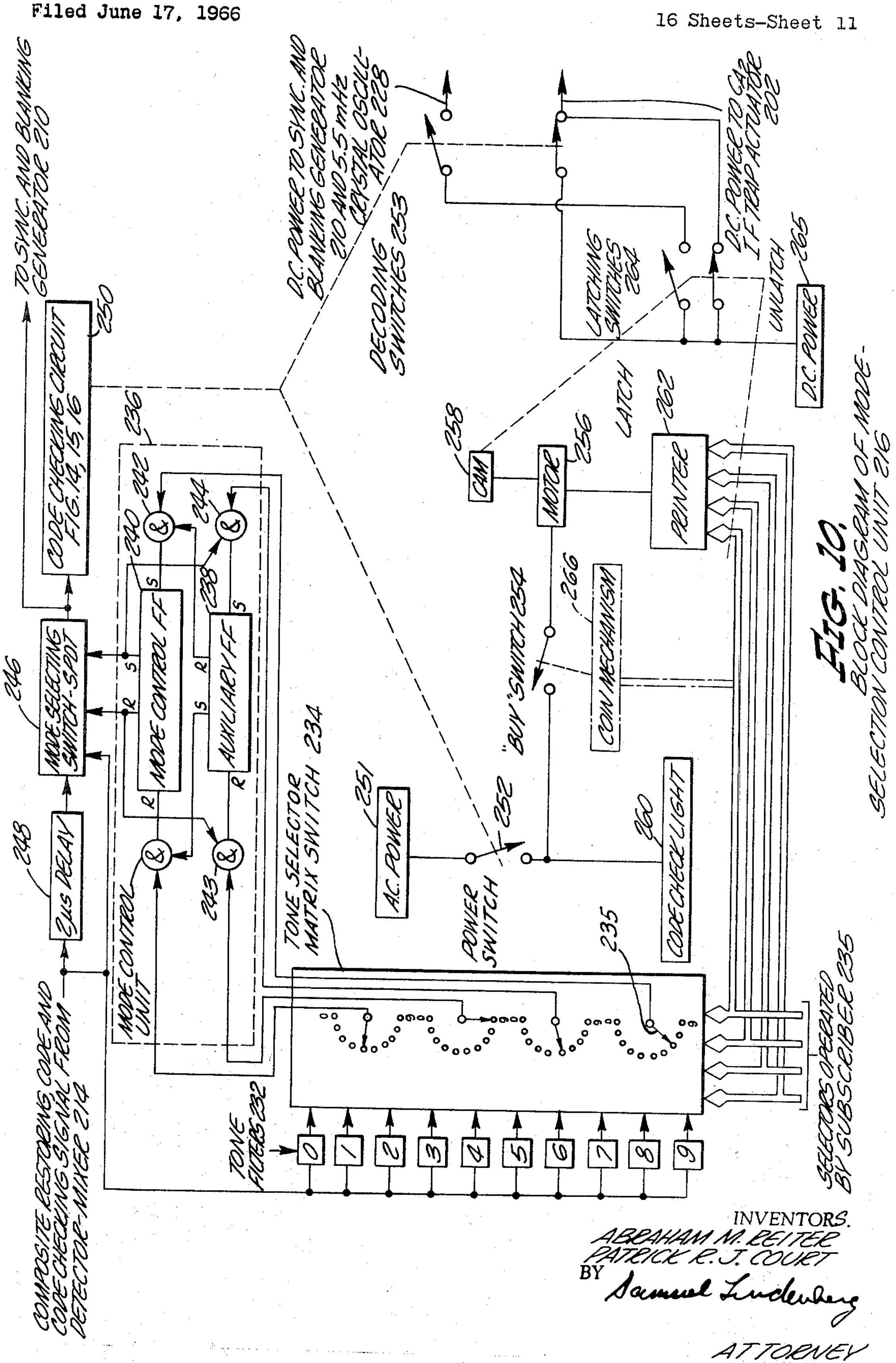
FIG. 10 is a block schematic diagram of a mode selection control unit 216, used in a subscriber receiver attachment.

FIG. 10 is a schematic block diagram of the details of the mode selection control unit 216. The input to the mode selection control unit is the composite restoring, code and code checking signal which is demodulated from the $C_{A1}$ IF carrier in detector mixer 214. This waveform has been previously described and illustrated in FIG. 8E.

The randomly sequenced code tones, $F_0$ through $F_9$, are separated by the ten tone filters 232 and applied to a 4 x 10 tone selector matrix switch 234. This is identical with the matrix switch 150 described in FIG. 5, which are illustrated as four ten-input position switches. Only four of a possible ten tones are used for any one program transmission, so there can only be four inputs to matrix switch 234, but these may be correctly selected by the subscriber operating selectors 235 of the tone selector switch if he is to enjoy his program. When correctly selected, the four randomly sequenced tone frequencies are routed to the proper ones of four outputs from the matrix switch 234 and become four separate inputs to a mode control unit 236, consisting of two flip-flops respectively 239, 240, and four AND gates respectively 241, 242, 243, 244 which are interconnected.

It will be recognized that the configuration of the two flip-flops 238, 240 and four gates 241 through 244 is identical to that of two similar flip-flops 182 and 184 and four gates 166, 168, 170 and 172 shown in FIG. 5, as used at the transmitter. The operation of these circuits was explained at length with reference to both FIGS. 4 and 5. It will also be seen that the flip-flop gate combination in mode control unit 236 is driven by four code tone inputs as is the corresponding combination in FIG. 5. If the four code tones are correctly selected by the subscriber in matrix switch 234, and therefore correctly routed to the appropriate AND gates in mode control unit 236, the switching pattern of the two flip-flops 238, 240 will be identical to the transmitter flip-flops 182 and 184 in FIG. 5. One of those flip-flops, designated the mode control flip-flop 240, may therefore be used to control a mode selecting switch 246 so that it is in complementary synchronism with the mode determining switch 186 at the transmitter (see FIG. 4).

The mode selecting switch 246 receives as its input the composite restoring, code and code checking signal indicated by waveform 8E. There are actually two inputs to the switch 246. One of these is the composite signal indicated by waveform 8E, delayed by 2 microseconds by delay circuit 248, and the other is the same waveform undelayed. The mode selecting switch is capable of selecting one or the other of its two inputs in response to the mode control unit 236.

The output of mode selecting switch 246 is delivered to the sync and blanking generator 210 (FIG. 9) and to a code checking circuit 250. Both of these will be considered more fully later herein.

If the correct tone frequencies are selected by the subscriber properly setting matrix switch 234, the mode control unit 236 will cause the mode selecting switch 246 to be in complementary synchronism with the mode determining switch 186 (FIG. 4) at the transmitter, and when the transmitter mode determining switch 186 introduces 2$\mu$S delay into the composite restoring, code and code checking signal, the mode selecting switch 246 will select the undelayed input. When the transmitter mode determining switch 186 removes the 2$\mu$S delay from the composite restoring, code and code checking signal, the mode switch 246 will select the delayed input. Because of the complementary synchronism of the two mode switches at transmitter and receiver, the output of the mode selecting switch 246 will therefore be a continuous composite restoring, code and code checking signal, with no time aberrations. This signal is suitable for proper use by the sync and blanking generator 210 in a manner to be described later herein. Moreover, a code checking circuit 250 can detect whether or not the mode selecting switch 246 is in complementary synchronism with the transmitter, in a manner to be described later herein.

For the present it should be understood that, if the switching of mode selecting switch 246 is correct, the code checking circuit 250 actuates a power switch 252 and decoding switches 253. When switch 252 closes, it applies AC from a source 251 to the code check light 260, which then turns on, thus verifying for the subscriber that he has, in fact, selected the correct tone frequencies, and, hence, the correct code. He may now depress the "buy" switch 254, thus signifying his willingness to purchase the program. AC power is, of course, available through power switch 252 and closure of buy switch 254 admits the power to a motor 256 which executes an operating cycle in conjunction with a cam 258. The motor cycles to operate a printer 262 which records information indicative of the positions of the selectors as previously set by the subscriber in matrix switch 234, which also sets the printer 262. Simultaneously, the cam 258 operates and latches the latching switches 264 which, in conjunction with the decoding switches 253, furnishes the DC power from a source 265 to the sync and blanking generator 210, to the 5.5 mHz. crystal oscillator 228, and cuts off power to the $C_{A2}$ IF trap actuator 202 in a manner described previously.

The latching switches 264 remain latched until the switch selectors 235 in matrix switch 234 are disturbed. This happens when the subscriber adjusts the switch selectors to select the new code tone frequencies assigned to a subsequent subscription program.

A coin mechanism 266 may be associated with one of the switch selectors 235 which operates the matrix switch 234. The position of the associated selectors mechanically set an indicated price demand which must be satisfied in order to close the buy switch 254. In this manner, the decoder attachment may be made usable for cash operation instead of credit operation. With cash operation, the subscriber of course does not have direct access to the buy switch. Coin payment in the amount demanded performs this operation. Apparatus illustrating this operation is shown, for example, in Pat. No. 2,966,980 to Nyberg.

Figure 11:
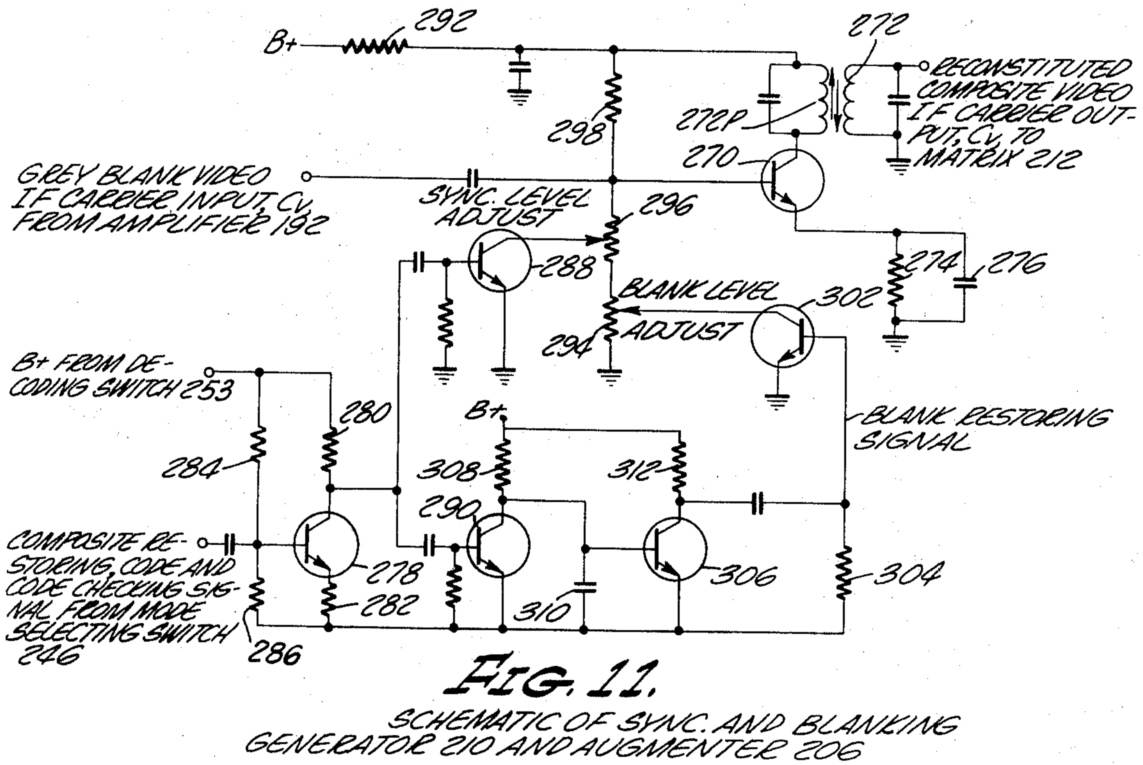
FIG. 11 is a circuit diagram of the sync and blanking generator 210, and of the augmenter 206, shown in FIG. 9.

FIG. 11 is a schematic diagram of the sync and blanking generator 210 and augmenter 206 in the decoder attachment. The augmenter includes a transistor 270 having a grey-blank video applied to its base. Its collector is connected in series with the primary winding 272P of a video IF transformer 272. The primary winding connects the collector to B+ through a resistor 292. The secondary winding provides reconstituted composite video. The emitter of transistor 270 is connected through a resistor 274 to ground. A capacitor 276 is connected across the resistor 274.

A transistor 278 has composite restoring, code and code checking signals applied to its base from the mode selecting switch 246. Its collector receives B+ through a resistor 280 from the decoding switch 258. Its emitter is connected to ground through a resistor 282. Resistors 284 and 286 are connected in series across the B+ supply and provide a bias voltage to the base of transistor 278.

The collector of transistor 278 is coupled to the base of a transistor 288 and to the base of a transistor 290. The collector of transistor 288 is connected to the slider arm of a potentiometer 296 which is connected in series with resistor 298 and with another potentiometer 294. The emitter of transistor 288 is connected to ground. Potentiometers 294, 296 and resistor 298 are connected to B+ through resistor 292. The base of transistor 270 is connected to the junction of resistor 298 and potentiometer 296. The slider of potentiometer 294 is connected to the collector of a transistor 302. The emitter of this transistor is connected to ground. The base is connected through a capacitor 304 to the collector of transistor 306.

The collector of transistor 290 is connected to B+ through a resistor 308 and is also connected to the base of transistor 306. The base of transistor 306 is connected to ground through a capacitor 310. The collector of transistor 306 is connected to B+ through a resistor 312.

The augmenter 206 is actually a video IF amplifier comprising transistor 270 and associated circuit components, whose gain is controllable to three predetermined values. Minimum gain occurs when transistors 288 and 302 are cut off, because the bias current in transistor 270, determined by the resistance network 298, 296, 294 is then a maximum. Maximum gain occurs in transistor 270 when transistor 288 is saturated (or when transistors 288 and 302 are both saturated). When transistor 288 is saturated, potentiometer 294 and a controllable portion of potentiometer 296 are effectively short circuited, which reduces the base potential of transistor 270, and hence reduces its bias current. The wiper of potentiometer 296 is adjusted so that, under these conditions, the gain of transistor 270 is twice its minimum value. If transistor 302 is also saturated when transistor 288 is saturated, it does not influence the result, because transistor 302 can only short circuit a portion of potentiometer 294 which has already been short circuited by transistor 288. When transistor 302 only is saturated, a controllable portion of potentiometer 294 is short circuited, and the gain of transistor 270 assumes an intermediate value. Adjustment of the wiper of potentiometer 294 allows the the gain of transistor 270, under these conditions, to be adjusted to 75% of its maximum value.

Transistor 278 comprises an amplifier which receives the composite restoring, code and code checking signal from mode selection switch 246 in the mode selection control unit 216, shown in FIG. 10. It applies this signal, whose waveform is 8E, to transistors 288 and 290. B+ to transistor 278 is controlled by the appropriate decoding switch 253 of the mode selection control unit 216 and transistor 278 is of course thereby only activated in response to appropriate actions by the subscriber as discussed hereinabove.

Figure 12:
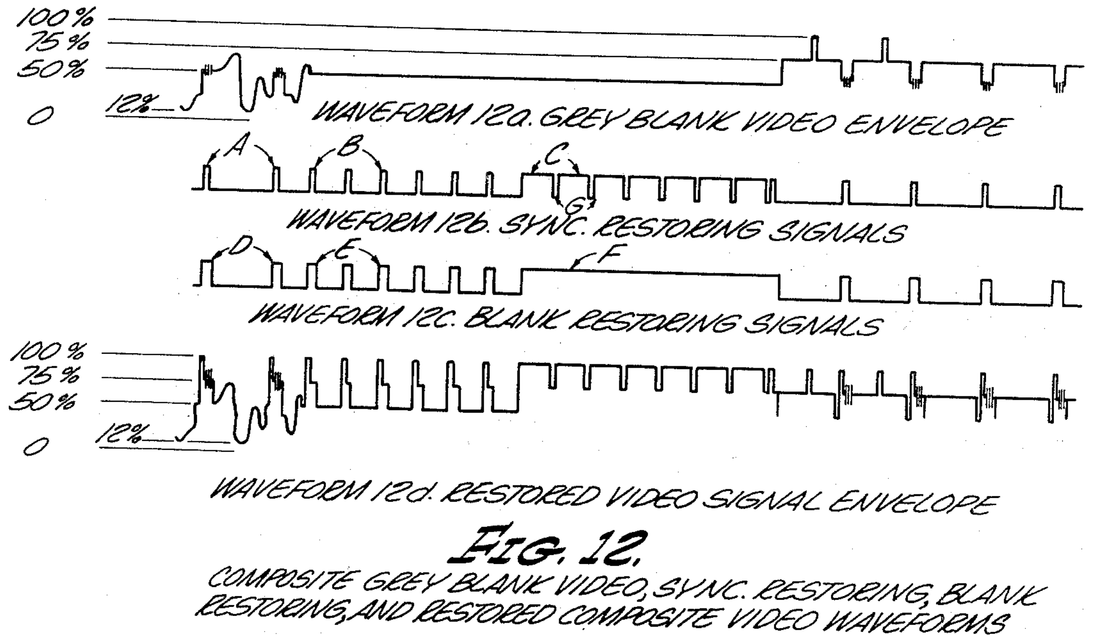
FIGS. 12 and 13 represent various waveforms in the receiver attachment which are shown to assist in an understanding of the invention.

Transistors 288 is the "sync generator" portion of the sync and blanking generator 210. In reality it is a sync stripper, as it is arranged to reject the code tone and code checking tone portion of the composite restoring, code and code checking signal, illustrated by waveform 8E, which it receives from transistor 278, and conducts (and saturates) only in response to the composite restoring (or composite sync) portion thereof (shown by the waveform 12B in FIG. 12) by the use of well known amplitude separation techniques. Thus the gain of transistor 270 rises to 100% during the composite sync pulse periods.

Transistors 290 and 306 constitute a sync stretching circuit and comprise a sawtooth generator 290 and inverting amplifier 306. The bias of transistor 290 is such that only the composite sync portion of the composite restoring, code and code checking signal input, also derived from the mode selecting switch 246 causes transistor 290 to conduct. This causes capacitor 310 to discharge rapidly, grounding the base of transistor 306, thereby cutting it off. When the pulses disappear, as when transistor 290 is cut off during the interpulse intervals, capacitor 310 charges through resistor 308, so that the turn on of transistor 306 is delayed. As a result, across the collector load resistor 312, of transistor 306 there is developed a positive going waveform which consists of sync which is "stretched" by an amount governed by the time constant of capacitor 310, and resistor 308. This waveform is 12C shown in FIG. 12 and it is seen that the short duration horizontal sync pulses A of waveform 12B are stretched to the width of horizontal blanking as shown at D of waveform 12C. The same is true of the equilizing pulses B in waveform 12B which are shown also to have been widened to the width of horizontal blanking as at E in waveform 12C. The broader pulses C, which form part of the vertical sync restoring pulse, are similarly stretched so that the narrow intervals, C, between them, disappear entirely, yielding the broad vertical blanking pulse F of waveform 12C. The waveform 12C thus has the characteristic of composite blanking as it comprises both horizontal blanking pulses D and vertical blanking pulses F, all resulting from the action of the pulse stretcher circuit including transistors 290 and 306 and their associated components. This signal is applied to transistor 302. Transistors 302, 306 and 290 collectively constitute the blanking generator portion of sync and blanking generator 210.

The action of the circuit of FIG. 11 can now be clearly understood. No pulses at all are applied to either transistor 288 or 302 during the actual video periods of the grey-blank video waveform 12A, which of course is modulated upon the video carrier $C_V$, and which is delivered as an IF input to transistor 270 from amplifier 192. The gain of transistor 270 during the video periods remains at 50% of maximum. The sync restoring waveform 12B saturates transistor 288 and thereby causes the gain of transistor 270 to rise to 100% of maximum. The fact that transistor 302 is also saturated during this time by the simultaneous presence of the blank restoring waveform 12C, does not affect this situation, for reasons previously explained. However, at those times when the blanking pulses are present at transistor 302, and transistor 288 is cut off, the gain of transistor 270 becomes 75% of maximum. As a result, the grey-blank video envelope of waveform 12A is augmented by transistor 270 so that it has the appearance of waveform 12D at its output. Not only are horizontal and vertical sync restored to their proper levels with respect to the actual video, but the horizontal and vertical blanking are restored as well. The $C_V$ IF carrier, modulated with the restored video, is coupled to the matrix circuit 212 through tuned IF transformer 272.

Figure 13:
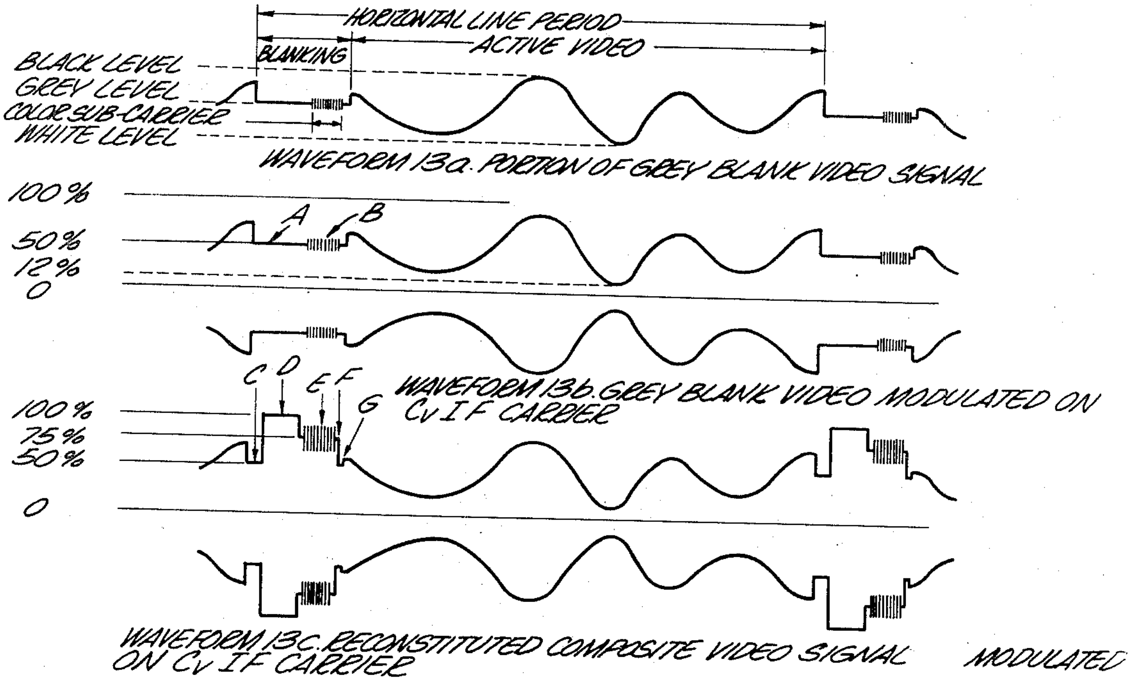

FIG. 13 shows in greater detail waveforms indicating the effect of the augmenting process at a horizontal line rate. The unrestored grey-blank video IF carrier is shown in waveform 13B and the restored video IF carrier is shown in waveform 13C. A represents the blanking interval which, in the encoded video, remains at a constant 50% carrier level. The color burst B, if present, is also at reduced amplitude. In waveform 13C, the sync pulse D is shown to have risen to its proper value of 100% carrier, while the blanking interval F is shown to be at its correct 75% level. The color burst E is also enlarged to its proper amplitude. The front porch C remains unrestored at 50% carrier level, but this is of no consequence because sweep retrace does not commence until the commencement of the sync pulse D.

The unrestored "tail" G is also of no consequence because sweep retrace is over by the time it appears.

FIG. 13 shows in closer detail the effect of the augmenting process at a horizontal line rate. The unrestored grey-blank video IF carrier is shown in FIG. 13B and the restored video IF carrier is shown in FIG. 13C. A is of course the blanking interval which, in the encoded video, remains at a constant 50% carrier level. The color burst B, if present, is also at reduced amplitude. In FIG. 13C, the sync pulse D is shown to have risen to its proper value of 100% carrier, while the blanking interval F is shown to be at its correct 75% level. The color burst E is also enlarged to its proper amplitude. The front porch C remains unrestored at 50% carrier level, but this is of no consequence because sweep retrace does not commence until the commencement of the sync pulse D.

The unrestored "tail" G is also of no consequence because sweep retrace is over by the time it appears.

Thus a unique restoring circuit has been described, which allows the transmission of a securely encoded composite grey-blank video waveform, and yet permits restoration of composite sync and blanking to their correct amplitude values, thus avoiding completely any problem with visible retrace in the decoded picture.

It should be noted that, because the two modes of transmission of the composite restoring, code and code checking signal are distinguished only by relative time delay, there are no significant problems in avoiding mismatch in the output of the mode selection switch 246. The relative time delay between the two transmission modes, as determined by the delay line 188, at the transmitter, is 2 $\mu$S. This delay value, while not crucial to the invention disclosed herein, represents a satisfactory compromise between the desire to thwart the "pirate" or "bootlegger," and good engineering practice. If a pirate or bootlegger contrived to demodulate the two mode restoring signal, and further contrived, for example, to synchronize a standard 21" television receiver with this two mode signal, the result would be a picture which would frequently and abruptly jitter horizontally by nearly ¾". Such a result would clearly be completely devoid of entertainment. To achieve an entertaining result, the same pirate or bootlegger would be obliged to duplicate the entire mode selection apparatus heretofore described, which is clearly a task requiring considerable technical and manufacturing resources.

While it is thus evident that the technical security afforded by the disclosed method of distinguishing between the two modes of transmission of the video decoding signal is very high, it will also be shown that the problems of avoiding mismatch between the two recovered modes, in an authorized decoder, are by no means formidable. As the distinction between the two modes of transmission of the restoring signals is only one of time delay, then the only real problem is one of providing, in many decoders, a switchable delay line with the requisite accuracy.

It has been verified experimentally that a switching accuracy of $\pm 40$ $n$S, or less, will yield a restored picture with no perceptible jitter. With the chosen delay of 2 $\mu$S, this indicates a tolerance on the decoder delay line of $\pm 2\%$. In view of the narrow bandwidth required to pass the composite restoring waveform (<0.5 mHz.), a delay line with a nominal delay of 2.0 $\mu$S and with a tolerance of $\pm 2\%$ is neither remarkable nor expensive. In fact, a delay tolerance of $\pm 1\%$ is quite consistent with good commercial practice, which corresponds to a "mismatch" of only $\pm 20$ $n$S. Such a synchronizing accuracy would not only result in a completely jitter-free picture, but would afford a 2:1 safety factor over and above the delay accuracy which is actually required.

The action of the code checking circuit 250 in FIG. 10 will now be examined in more detail. The basic purpose of the code checking circuit is to verify whether or not the mode selecting switch 246 is being properly instructed by the mode control unit 236 (i.e., to determine whether or not the mode selecting switch 246 is in complementary synchronism with the mode determining switch 186 at the transmitter), and, in response to the switching state of mode selecting switch 246, to perform a variety of control functions as previously described.

There are, as has been previously described, two inputs to the mode selecting switch 246, and these are the composite restoring, code and code checking signal represented by waveform 8E, taken directly from detector mixer 214 and the same waveform delayed by 2.0 $\mu$S by delay line 248. If mode selecting switch 246 is in complementary synchronism with the transmitter mode determining switch, then the output of switch 246 will be a steady waveform, as shown by 8E, with no random periodic time aberrations. If the mode selecting switch 246 is not in complementary synchronism with the transmitter mode determining switch 186 as a result of an incorrect selection of the code tone frequencies in matrix switch 234 by the subscriber, the mode selecting switch will select the wrong one of its two inputs at least part of the time. This means that the output of the mode selecting switch will periodically abruptly shift its phase $\pm 2.0$ $\mu$S with respect to the correct phase. These abrupt phase shifts, of course, can only occur during the code tone intervals which it will be recalled are transmitted as part of the composite restoring, code and code checking waveform 8E, one at a time, during a period corresponding to the last three lines of vertical blanking.

Within the scope of this invention, there follows a description of three possible methods of accomplishing the code checking or verification function, by examining the waveform output from mode selecting switch 246.

Method 1 consists in applying the phase shifted waveform to a high Q frequency discriminator, tuned to 15.750 kHz., which will produce an output in response to the frequency modulation which corresponds to the phase shift in the fundamental frequency of the 15,750 kHz. horizontal pulse components of the composite restoring, code and code checking signal. The output of the discriminator may be detected and integrated, and a control function derived therefrom. Such an arrangement is illustrated in FIG. 14.

Figure 14:
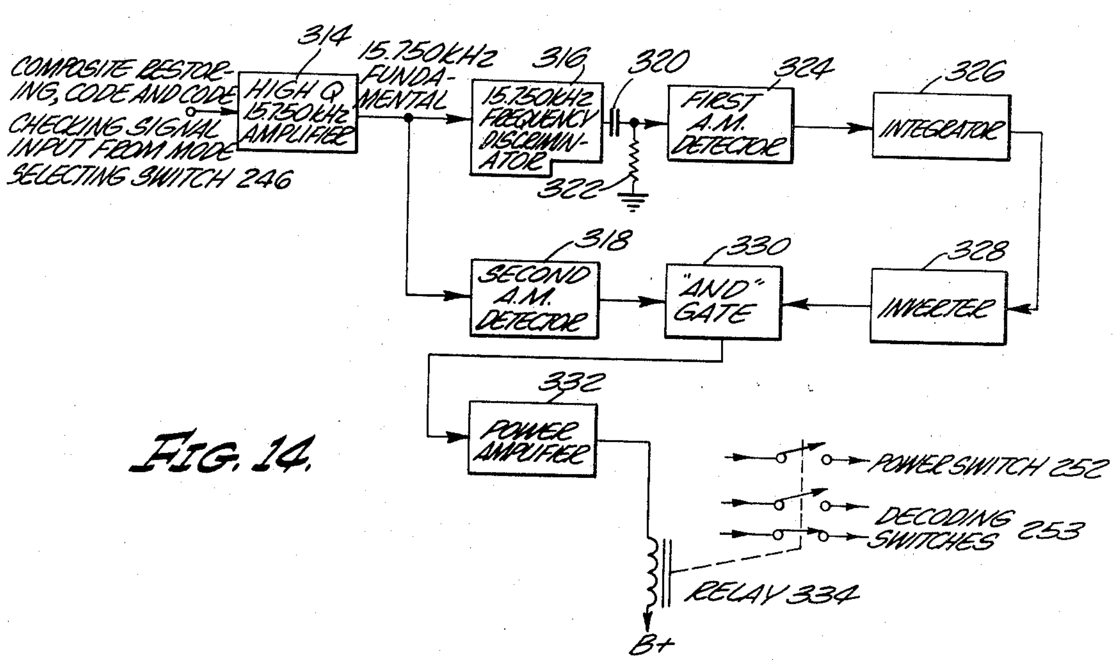
FIGS. 14, 15 and 16 are block diagrams of three different arrangements for verifying that a subscriber has properly operated his selectors in his receiver attachment.

In FIG. 14, a high Q 15.750 kHz. amplifier 314 selects the fundamental horizontal component from the composite restoring, code and code checking signal input from mode selecting switch 246 and presents it to a 15.750 kHz. frequency discriminator 316 as well as to a second AM detector 318. The discriminator detects the frequency modulation corresponding to the periodic phase shifts in the input waveform and its output will consist of an AC signal corresponding to those phase shifts. This signal is AC coupled, by coupling network CR, including capacitor 320 and resistor 322 to a first AM detector 324 to produce unidirectional pulses which are then integrated in integrator 326 to produce a steady DC voltage which is applied to an inverter 328.

The inverter 328 inverts the sense of its DC input before applying it to AND gate 330 as a first input.

The second AM detector 318 detects the presence of the 15.750 fundamental output from amplifier 314, develops a study DC voltage therefrom, and applies this signal to the AND gate 330 as a second input. The output of AND gate 330 is applied to a power amplifier 332 which operates relay 334 to control the decoding switches 253 and the power switch 252.

The code checking operation is as follows. If the decoder is tuned to a subscription channel, the composite restoring and code signal will be present at the input to 15.750 kHz. amplifier 314 and the second AM detector 318 will rectify a DC voltage, which is applied as a first input to AND gate 330. If the mode selecting switch 246 is switching correctly, there will be no phase perturbation of the 15.750 kHz. output from amplifier 314 and hence no frequency modulation will be detected by the discriminator 316. No AC signal will be detected by first AM detector 324 to be integrated by integrator 326 and applied to inverter 328. Inverter 328 inverts the sense of its input, and in response to no input from integrator 326 applies a steady DC input to AND gate 330. In response to both inputs, AND gate 330 delivers a steady DC input to power amplifier 332 which actuates relay 334 to operate switches 252 and 253. Closure of power switch 252 allows motor 256 to operate in conjunction with cam 258, when the buy switch 254 is closed. The cam latches latching switches 264 to their operating state, and in conjunction with decoding switches 253, which are also in their operating state, power is applied to the sync and blanking generator 210, and 5.5 mHz. crystal oscillator 228, but is denied to the trap actuator 202. From previous description, it is clear that the subscriber may now enjoy the program.

If the selectors 235 are left undisturbed at the conclusion of the program, the latching switches 264 remain latched. However, a new code number will be assigned to a subsequent subscription broadcast and the selectors will be incorrectly set for this code number. Thus the incorrect code tone frequencies will be selected in matrix switch 234 so that the mode selecting switch 246 will not be switching correctly, and there will be phase pertubations of the output signal from the mode selecting switch 246 and the frequency discriminator 316 will detect the corresponding frequency modulation of the 15.750 kHz. output from amplifier 314, to produce an AC signal output. This signal, detected by first AM detector 324 and integrated by integrator 326 is applied to inverter 328. Inverter 328, inverting the sense of its input, no longer applies an input to AND gate 330. No output from AND gate 330 will be applied to power amplifier 332 and the relay 334 will therefore be inoperative. Power switch 252 will therefore be open and the decoding switches 253 will be in their inoperative state. Even though the latching switches 264 are in their operative state, the video and audio decoding circuits remain inoperative and the subscriber will be unable to view the program. In order for him to view, he must operate the selectors 235 to select the appropriate code tone frequencies in matrix switch 234, which action unlatches latching switches 264, and follows the procedure outlined hereinabove.

If the subscriber inadvertently selects the wrong code tone frequencies in matrix switch 234, it is clear from the above description of the operation of the code checking circuit that the power switch 252 will now be open and that he will be unable to purchase and enjoy the program.

The subscriber may inadvertently tune the decoder to a nonsubscription channel, and in the mistaken belief that he is tuned to a subscription channel, may perform the necessary code selecting functons in matrix switch 234 in accordance with instructions read from a program guide, newspaper advertisement, etc. He should, of course, be protected, in these circumstances, from committing a "purchase," either by depositing coins in coin mechanism 266 or by depressing buy switch 254, which event could be recorded in printer 262 to form the basis of a subsequent erroneous bill. It is clear that if he is not tuned to a subscription channel, there will be no input at all to the code checking circuit from mode selecting switch 246, because the $C_{A1}$ IF carrier, which carries the composite restoring, code and code checking signal, is not present in a normal, nonsubscription broadcast. Consequently, there will be no input to inverter 328 just as there would be no input if the subscriber had in fact tuned to a subscription television channel and had, in fact, made the correct code selection. However, the subscriber is protected in these circumstances by the monitoring action of second AM detector 318 which senses the absence of a 15 kHz. output from amplifier 314 by developing no DC signal input to AND gate 330. Even though the inverter 328, with no input from integrator 326 is applying a DC input to AND gate 330, AND gate 330 is still inoperative. Power amplifier 332 thus fails to operate relay 334 and the status of switch 252 remains such that the buy switch 254, deprived of power through power switch 252, is inoperative. Code check light 260 also fails to come on.

While the first method of performing the code checking or verification function described above is workable, it has some disadvantages. It is evident that the total phase shift of the output of mode switch 246 cannot exceed $\pm 2.0\ \mu S$, with the 2 $\mu S$ delay as specified in delay line 248 and the corresponding 2 $\mu S$ delay as specified in delay line 188 at the transmitter. In comparison with the 63.0 $\mu S$ period of the 15.750 kHz. fundamental component of the composite restoring, code and code checking signal, the total phase shift is very small. The signal that can be rectified by first AM detector 324 is therefore also small, and must be selected from perturbations arising from the vertical components in the waveform input to amplifier 314. To minimize the perturbations arising from the vertical components, the Q of the amplifier 314 and discriminator 316 must be made very large, and even so there are difficulties in distinguishing the wanted disturbance signal from unwanted disturbance signals.

A second method of performing the code checking function is to derive a high order harmonic of the 15.750 kHz, fundamental signal, whose half period is comparable to the magnitude of the phase shift due to incorrect switching. If this high order harmonic is used to excite a resonant circuit, then the amplitude of the signal developed across the resonant circuit will remain at a steady value if the switching of mode selecting switch 246 is correct. However, if the phase of the output of mode select switch 246 is shifted by $\pm 2\mu S$ by incorrect switching, the fundamental 15.750 kHz. component will be shifted by a like amount, and so will the phase of the high order harmonic used to excite the resonant circuit. If the half period of the harmonic chosen is comparable to the $\pm$ 2 $\mu S$ time perturbations, the angular phase of the harmonic signal will periodically shift abruptly by an amount which is comparable to 180°, and the amplitude of the signal developed by the resonant circuit will change dramatically during the transient periods, while the circuit readjusts itself to the new phase. The duration of each transient disturbance is a function of the bandwidth of the resonant circuit, and the change in amplitude is a function of the phase shift, in degrees, of the harmonic exciting signal. A suitable harmonic of 15.750 kHz., which might be used, is the tenth, which is of course 157.500 kHz. This frequency has a half period of 3.175 $\mu S$ which is comparable to both 2 $\mu S$ and 4 $\mu S$, which represent the possible signal phase shifts which may abruptly occur as a result of incorrect switching in mode selecting switch 246. It is appropriate to note here that because the output of mode selecting switch 246 may shift abruptly by either 2 $\mu S$ or 4 $\mu S$, because of incorrect switching, it is not satisfactory to employ a harmonic of the 15.750 kHz. fundamental, which has a half period corresponding more exactly to 2 $\mu S$. (The nearest harmonic would be the sixteenth, which is a frequency of 252.000 kHz., with a half period of 1.99 $\mu S$.) The reason is that, while this maximizes the transient disturbance across a tuned circuit excited by this frequency, when the phase shifts abruptly by 2 μS, the disturbance is almost zero if it shifts by 4 μS. 4 μS corresponds almost exactly to a full period of the selected frequency, which is of course 360° and which corresponds to 0°. Thus an abrupt shift of the selected frequency in a resonant circuit by 360° is construed as no shift at all, and negligible transient amplitude disturbances will be developed. By using a harmonic frequency whose half period is approximately the median of 2 μS and 4 μS, approximately equal transient disturbances will be developed by either phase perturbation.

Figure 15:
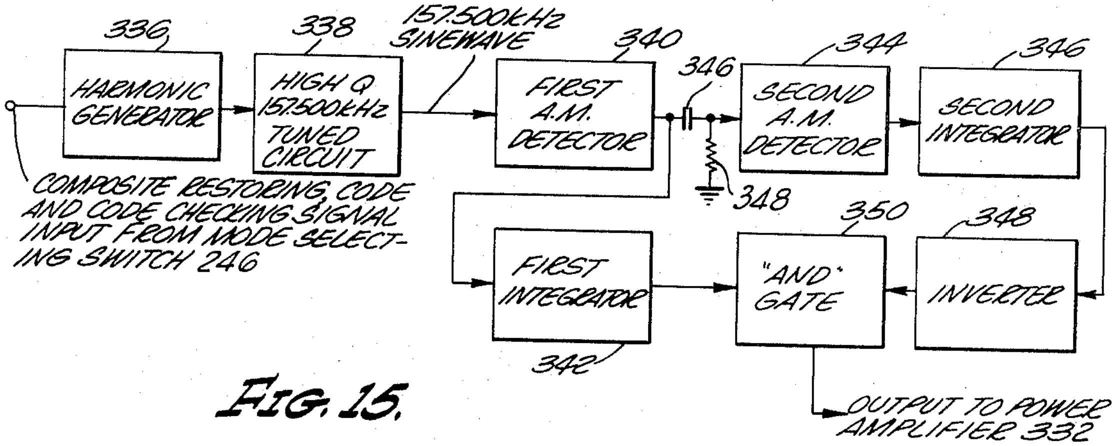

FIG. 15 shows a block diagram of a code checking arrangement according to the second method. The composite restoring, code and code checking signal waveform output from mode selecting switch 246 is applied to a harmonic generator 336, and a high Q 157.500 kHz. tuned circuit 338 selects and magnifies the tenth harmonic of the horizontal component of the waveform input to 336. Under conditions of correct switching in mode selecting switch 246, there are no periodic abrupt phase perturbations of the input to the harmonic generator 336 nor of the input to the high Q circuit 338 which thus develops a constant amplitude 157.500 kHz. sinusoidal signal. This is detected by a first AM detector 340 to produce a steady DC voltage output which is applied as a first input to AND gate 344 through first integrator 342. The output of detector 340 is also applied to a second AM detector 344 through an AC coupling network including a serially connected capacitor 346 and shunt resistor 348. The resistance capacitor network isolates the steady DC signal from the input of a second AM detector 344 which therefore has no input under these conditions. It therefore delivers no input to a second integrator 346 which in turn supplies no input to an inverter 348. Inverter 348 inverts the sense of its input and, in the absence of input, supplies a DC input to the AND gate 350. AND gate 350 thus is enabled by its two inputs and supplies an output to power amplifier 332, (see FIG. 14). The action of power amplifier 332 has been previously described in connection with the first method of code checking, and it will be clear that under these conditions the subscriber will be able to purchase and enjoy the program.

If the input to harmonic generator 336 is periodically abruptly disturbed in phase by incorrect switching by mode selecting switch 246, because of incorrect operation by the subscriber of the matrix switch selectors 235, the angular phase of the harmonic selected is disturbed by a large amount. Each abrupt phase shift will result in a large transient disturbance of the amplitude of the sinusoidal voltage developed by high Q 157.500 kHz. tuned circuit 338 which results in a large effective amplitude modulation of the sinusoidal signal. This is detected by the first AM detector 340, which of course develops an AC signal, corresponding to the effective FM, superimposed upon its DC output. The combined signal is applied to first integrator 342 which eliminates the AC component from the output of detector 340 and applies a steady DC signal to AND gate 350. The AC coupling network eliminates the DC component from the output of detector 340 and applies only the AC component to the second AM detector 344, which develops unidirectional pulses therefrom and applies these to the second integrator 346. The output of second integrator 346 is thus a steady DC signal which is applied to inverter 348. Inverter 348 inverts the sense of its input and therefore now applies no input to AND gate 350. Thus, even though AND gate 350 has a first input from first integrator 240, the absence of a second input from inverter 348 results in no output from the AND gate to power amplifier 332. From the previous description of the operation of power amplifier 332 and its associated circuits, it is clear that the subscriber cannot now purchase and enjoy the program.

Finally, if the decoder is not tuned to a subscription channel, there will be no signal output at all from mode selecting switch 246 and no 157.50 kHz. harmonic signal can be generated across the tuned circuit 338. As a consequence, there is no first input to AND gate 350 via first integrator 342, from first AM detector 340. Thus, even though there is now a second input to AND gate 350, because of the absence of transient voltages across tuned circuit 338, there is now no output from AND gate 350 to power amplifier 332. Under these circumstances, the subscriber is protected from inadvertently committing himself to an erroneous "purchase" or subsequent erroneous bill.

This second method of providing the code checking or verification function is basically superior to the first method, because the use of a harmonic signal whose half period is comparable to the periodic timing errors which result from incorrect switching in mode selecting switch 246, results in a large amplitude perturbation of the sinusoidal signal which is developed across the high Q tuned circuit 338. It is necessary however that the Q of tuned circuit 338 be exteremely large in order to eliminate amplitude perturbations of the harmonic signal due to the vertical and other components in the composite restoring, code and code checking signal waveform. The Q in fact must be so large that it can only be provided by a quartz crystal resonator. With such a large Q (of the order of 10,000), the bandwidth of the tuned circuit 338 becomes extremely narrow and the accuracy of the fundamental frequency of the horizontal synchronizing pulse components in the composite restoring, code and code checking signal becomes important. With color transmissions, these signals are maintained within the requisite frequency tolerance, but with monochrome transmissions the horizontal frequency accuracy is sometimes related to the power line frequency, and may vary by a few tenths of one percent. The resultant harmonic frequency generated in harmonic generator 336 may therefore occasionally drift outside the very narrow passband of the high Q tuned circuit 338. This would, of course, cause the entire code checking system to become inoperative. With the present rapid growth in the amount of color programs which are transmitted, it is evident that all television transmission frequency standards will eventually become standardized to conform to those used in N.T.S.C. color transmissions, even though some of the programs may still be broadcast in monochrome. In this event, the deficiency of the second method of code checking will not exist, because the horizontal signals will all be transmitted with the requisite accuracy.

To overcome this difficulty, until such time that all transmission standards are upgraded, the third and preferred method of code checking or verification was devised. The third method is actually very similar to the second, with the important exception that the sinusoidal frequency, which is to be developed across a high Q tuned circuit, is multiplexed within the composite restoring, code and code checking signal waveform itself. In this manner the frequency can be very precisely controlled at the transmitter, in the grey-blank restoring and code signal generator 12 in FIG. 2, and is thereby made quite indepedent of the accuracy of the frequency standards employed in the normal composite video waveform input from the studio to the generator.

The multiplexed code checking frequency can be chosen to be 157.500 kHz., so that its half period is comparable to the abrupt 2 μS and 4 μS phase shifts of the composite waveform output from the mode selecting switch 246, when the mode selecting switch is not in complementary synchronism with the transmitter mode determining switch. However, the multiplexed code checking frequency is now precisely controlled with crystal accuracy, to match the center frequency of the very high Q circuit in the decoder. The composite restoring, code and code checking signal waveform, including the multiplexed code checking tone, is of course illustrated by waveform 8E.

Figure 16:
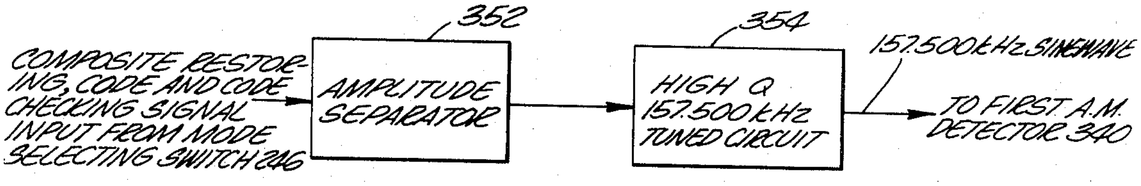

FIG. 16 shows a portion of the code checking circuit in the decoder attachment which is designed to make use of the code checking tone portion of the composite waveform 8E.

The composite restoring, code and code checking signal input from mode selecting switch 246 is applied to the input of an amplitude separator 352. Amplitude separator 352 uses well known techniques to reject the greater portion of the pulse components of the composite input and to amplify the smaller amplitude 157.500 kHz. code checking sinusoid. The output of the amplitude separator drives a high Q 157.500 kHz. tuned circuit 354, which is preferably a quartz crystal filter or resonator. The Q of tuned circuit 354 is so large that any amplitude perturbations due to the vertical or other components in the incoming composite waveform are eliminated and, with correct switching in mode selecting switch 246, a steady amplitude 157.500 kHz. signal is developed by tuned circuit 354. This signal is delivered to the first AM detector 340 of FIG. 15, and the subsequent operation is exactly as has been previously described.

It should be noted of course that the code checking tone portion of the composite restoring, code and code checking waveform 8E is necessary only for the third method of code checking and would be redundant if the first or second methods were used.

It is within the scope of this invention to invert the polarity of the grey sync video modulation of the video carrier $C_V$, at the transmitter, so that maximum carrier amplitude corresponds to peak white in the video signal and so that minimum carrier corresponds to peak sync, if peak sync were actually transmitted. This of course is actually done in some countries for normal television transmission. In such countries, if the subject subscription television were used, the augmenter 206 in the block diagram of FIG. 9 would be arranged to reduce the $C_V$ IF carrier amplitude during the sync and blanking intervals, instead of increasing it as has been hitherto described, in order to produce a correctly reconstituted IF video carrier output to the matrix 212. To achieve this the sync and blanking generator 210 and augmenter 206, as shown in FIG. 9, have to be rearranged somewhat in order to achieve the desired result.

Figure 17:
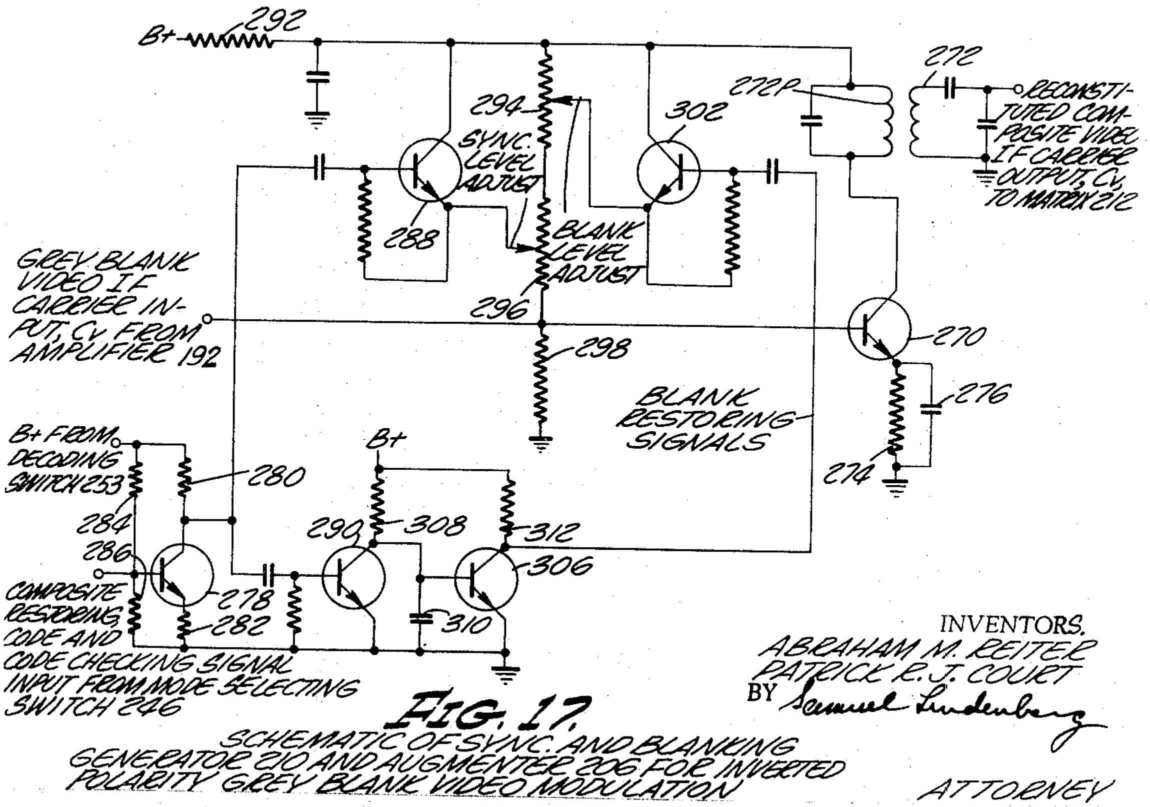
FIG. 17 is a schematic diagram of a sync and blanking generator and augmenter which are used in a receiver attachment for inverted polarity video.

FIG. 17 shows a rearranged circuit in which the relative positions of resistor 298 and potentiometers 296 and 294, which constitute the bias network for transistor 270, have been interchanged. Thus the short circuiting action of transistor 288 across potentiometer 294, and the selected portion of potentiometer 296 and the short circuiting action of transistor 302 across the selected portion of potentiometer 294 serve to increase the bias current in transistor 270 rather than deplete it, as was the case in the circuit of FIG. 11. It is now evident that, when both transistors 288 and 302 are cut off, as is the situation during the video portions of the waveform 12A, in FIG. 12, the bias current of transistor 270 is at a minimum, and the gain is at a maximum. During the blank restoring pulse periods D, E and F of the waveform 12C in FIG. 12, the transistor 302 is saturated, partially shorting potentiometer 294, causing the bias current in transistor 270 to rise to an intermediate value. This reduces the gain of transistor 270 to an intermediate value, adjustable by the wiper of potentiometer 294. During the sync restoring pulse periods A, B and C of the waveform 12B in FIG. 12, the transistor 288 is saturated, shorting potentiometer 294 and a portion of potentiometer 296. This increases the bias current in transistor 270 to a maximum value, and reduces the gain of transistor 270 to a minimum value which is adjustable by the wiper of potentiometer 296. All other elements in the circuit in FIG. 17 operate exactly as previously described for FIG. 11. Furthermore, in a subscription television system designed for use in a country employing the opposite polarity of video modulation, all of the other system elements, both in the transmitter and in the decoder attachment, would operate exactly as has been described earlier.

It is also possible however, and within the scope of this invention, to invert the polarity of video modulation at the transmitter during a subscription broadcast, with respect to that which is employed during a normal broadcast, to further enhance the subjective scrambling effect of the encoded video, and to further enhance the security of the system. If this stratagem is adopted, then the same augmenting circuit which has been described in conjunction with FIG. 17 can obviously be used in a decoder attachment to restore the composite sync and blanking components to the oppositely modulated grey-blank video carrier.

However, as it is necessary to present the subscriber's television receiver with a video carrier, which is not only restored, but which has correct modulation polarity, then it is required in the decoder to perform the additional functions of demodulating the restored video carrier, and remodulating a locally generated video carrier with a polarity which is intelligible to the receiver. When this is the case, certain features of the block diagram in FIG. 9 are no longer valid and certain features must be added. In particular, certain aspects of the program audio decoding circuits have to be rearranged, and it is necessary to provide the video carrier demodulation and remodulation facilities.

Figure 18:
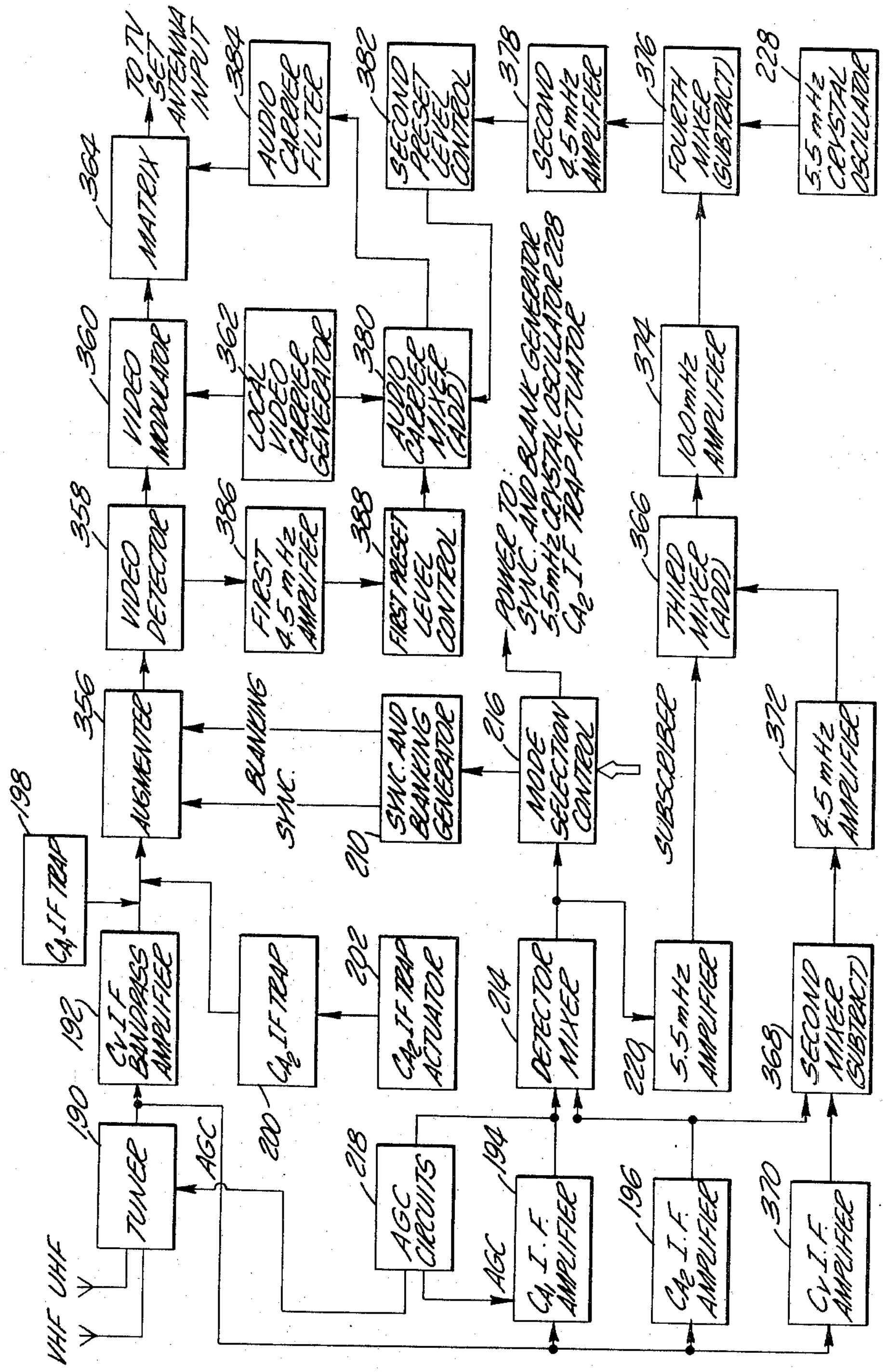
FIG. 18 is a block schematic diagram of a decoder for reconstituting inverted modulation grey-blank video and encoded audio.

FIG. 18 shows the block diagram of a decoder attachment which incorporates these changes. In FIG. 18, those circuits represented by boxes, which function identically with circuits represented by boxes in FIG. 9 are given the same reference numerals. Thus, an augmenter 356 is designed to restore inverted grey-blank video modulation of the $C_V$ IF carrier, as detailed in FIG. 17, and delivers this signal to a video detector 358 which demodulates the restored video modulation therefrom. The demodulated composite video waveform is applied to a video modulator 360 which receives, as a second input, the output from a local video carrier generator 362 which is a constant amplitude carrier frequency corresponding to a suitable unused television channel. This carrier frequency may be defined as $C_V$ (OUT). The detection polarity of detector 358 is such that video modulator 360 modulates the output of generator 362 in the normal manner, i.e., in which peak carrier corresponds to peak sync, and in which minimum carrier corresponds to peak white. The output from modulator 360 is delivered, as a first input to a matrix circuit 364.

The 5.5 mHz. amplifier 220 has been previously shown to have an output defined as $$5.5-fp-\frac{fi}{2}$$

and which is relatively free of amplitude modulation. This is now applied as a first input to a third mixer 366. The output of $C_{A2}$ IF amplifier 196 has also been previously defined as $$41.25-\frac{fi}{2}+\Delta$$

and this signal is now additionally applied as a first input to a second mixer 368. The second input to second mixer 368 is the output of a narrow band, $C_V$ IF amplifier 370, tuned of course to the IF video carrier at 45.75 mHz., which it receives from tuner 190. Because of tuner drift, this signal may be defined as $45.75+\Delta$, and its amplitude at mixer 368 is caused to be large compared with the first input to mixer 368, so that the minimum amplitude of the $C_V$ IF carrier, due to video modulation, is greater than the steady value of the $C_{A2}$ IF carrier. The second mixer 368 is a subtractive mixer and its output may be written:

$$45.75+\Delta-\left(41.25-\frac{fi}{2}+\Delta\right)=4.5+\frac{fi}{2}$$

Because of the amplitude relationships at the input of second mixer 368 the 4.5 mHz. output carrier is relatively free of video amplitude modulation. This signal is selected and amplified by 4.5 mHz. amplifier 372 and applied as a second input to the third mixer 366, which is an additive mixer. The output of mixer 366 may now be written:

$$5.5-fp-\frac{fi}{2}+\left(4.5+\frac{fi}{2}\right)=10.0-fp$$

This is a 10.0 mHz. carrier, with no drift component Δ, and which is modulated ±25 kHz. with only program audio. As both inputs to third mixer 366 are relatively free of amplitude modulation, the 10.0 mHz. output is also relatively free of AM. This signal is selected by 10 mHz. amplifier 374 and applied as a first input to a fourth mixer 376 which is a subtractive mixer. The second input to fourth mixer 376, which is arranged to be smaller in amplitude than the first input, is the output from the 5.5 mHz. crystal oscillator 228. The output of fourth mixer 376 may be expressed algebraically as:

$$10.0-fp-5.5=4.5-fp$$

This is clearly a stable center frequency 4.5 mHz. carrier, frequency modulated ±25 kHz. with program audio. As the output from crystal oscillator 228 is of steady amplitude, and is the smaller of the two inputs to fourth mixer 376, the 4.5 mHz. output from mixer 376, which is relatively independent of any amplitude variations of the larger input, is clearly of substantially constant amplitude. In other words, it has virtually no residual amplitude modulation and its level is quite independent of signal level variations of the carrier inputs to tuner 190. The 4.5 mHz. carrier, amplified by a second 4.5 mHz. amplifier 378 is applied as a first input to an audio carrier mixer 380, through a second preset level control 382. The second input to audio carrier mixer 380 is an output from the local video carrier generator 362, which of course has the frequency of the video carrier output to the subscriber's television receiver, and which has been defined as $C_V$ (OUT). Audio carrier mixer 380 is an additive mixer and its output is obviously $$C_V\ (\text{OUT})+4.5+fp$$

which is a stable center frequency carrier, frequency modulated ±25 kHz. with program audio, and which is 4.5 mHz. above the video carrier $C_V$ (OUT). This corresponds to the correct aural carrier position for the video carrier $C_V$ (OUT) and it is therefore suitable for combining with the modulated video carrier $C_V$ (OUT) in matrix 364, for use by the subscriber's receiver. Coupling to matrix 364 is through audio carrier filter 384, tuned of course to a frequency appropriate to the selected unused television channel.

The input to audio carrier mixer 380 derived from the second preset level control 382, is arranged to be the smaller of its two inputs, so that the output level of mixer 380, which depends upon the smaller input, is adjustable by the level control 382. Thus the proper ratio of video to audio carrier signal levels at the output of the decoder may be established by the second preset level control 382. Both carrier inputs to matrix 364 are quite independent of the signal strength received by tuner 190 and so, once established, they remain constant, and with the proper ratio.

Thus the operation of a decoder attachment has been described for correct decoding of inverted grey-blank video and its associated encoded program audio, in response to proper actions by the subscriber. It will be recalled, from previous descriptions, that in response to correct activation of the mode selection control unit 216, power is furnished to the 5.5 mHz. oscillator 228 and the sync and blanking generator 210, allowing these circuits to perform their decoding function. Power is denied to $C_{A2}$ IF trap actuator 202 so that $C_{A2}$ IF trap 200 is enabled, which, as before, prevents the $C_{A2}$ IF carrier from entering the augmenter 356.

If the subscriber does not correctly actuate mode selection control unit 216, then the 5.5 mHz. crystal oscillator 228 will be inoperative, and fourth mixer 376 will produce no 4.5 mHz. program audio carrier output. Following through the subsequent chain, it is obvious that there will be no input to audio carrier mixer 380 from level control 382 and hence no decoded program audio carrier output from mixer 364 for use by the subscriber's television receiver.

The sync and blanking generator 210 will also be inoperative, so that the output of augmenter 356 will be an unrestored, inverted grey-blank video IF carrier. Following the subsequent chain again, it is clear that the video carrier output from matrix 364 will be unrestored, but with correct modulation polarity.

The $C_{A2}$ IF trap 200, being disabled, allows the 41.25 mHz. program information IF carrier through augmenter 356 to video detector 358, which also has present the 45.75 mHz. grey-blank video IF carrier. A normal intercarrier sound detection process thus now occurs in video detector 358, resulting in a 4.5 mHz. intercarrier output to a first 4.5 mHz. amplifier 386. This process can obviously be written algebraically:

$$45.75+\Delta-\left(41.25-\frac{fi}{2}+\Delta\right)=4.5+\frac{fi}{2}$$

The input to amplifier 386 is thus a stable center frequency 4.5 mHz. carrier, frequency modulated ±12.5 kHz. with program information audio, and which is admitted to audio carrier mixer 380 through a first preset level control 388. Thus, audio carrier mixer 380, while deprived of a 4.5 mHz. carrier, frequency modulated with program audio, from second level control 382, now has instead a 4.5 mHz. carrier input, frequency modulated with program information audio, from first level control 388. Again, following through the subsequent chain, it is clear that the grey sync video carrier input $C_V$ (OUT) from matrix 364 will now have associated with it a correct frequency audio carrier, frequency modulated with program information audio.

Thus to summarize briefly, before payment is signified, the subscriber's receiver will reproduce a scrambled picture plus program information audio, and after payment is signified, the subscriber's receiver will reproduce a correctly decoded picture and correctly decoded program audio.

It should be noted that, because the video carrier is locally generated, it is easily possible, if desired, to arrange for the "unpaid" subscriber to be presented with a blank screen (instead of a scrambled picture), while his receiver still reproduces the program information audio. Additional switches may be provided in the mode selection control unit 216 to control the input to video modulator 360 from video detector 358. Thus, before payment is signified, there will be no grey-blank video input to video modulator 360, and the video carrier ($C_V$ OUT) input to matrix 364 will still be unmodulated. The subscriber's receiver will therefore produce no picture at all, but the existence of the unmodulated video carrier at its input will enable correct intercarrier detection and reproduction of the program information audio carrier.

It is also within the scope of this invention to incorporate the video and audio decoding functions and the associated control and code checking functions within an "integrated" television receiver, rather than furnish a decoder attachment which is to be associated with a standard receiver. In a situation where the transmission of subscription programs represents a substantial percentage of total television broadcasting time, such an integrated receiver makes economic sense, because as will be shown, many of the functions, which are duplicated or which are otherwise redundant in a separate receiver decoder arrangement, disappear in an integrated receiver, with resultant overall economy. Many countries derive the income to support television service by means of taxes rather than by advertising revenues. The collection of such taxes depends upon the honesty of television viewers in reporting the fact that they actually own a television receiver at all, and it is the painful experience of the authorities involved that the existence of a large percentage of receivers remain unreported, with consequent substantial loss of revenue. A logical solution to such a problem would be the adoption of encoded transmissions as a normal television broadcasting standard, so that the only television receivers in use would be integrated receivers with decoding facilities. The revenues to support the television service would then derive entirely from the charges levied for individual program purchases, and there would obviously be no loss of revenue for reasons outlined above with the taxation system. The ability of the broadcasting stations to charge a flexible program price schedule, including "free" programs, would make such a broadcasting system entirely practical, and it is obvious that within such an environment, there would be no need for other than integrated receivers.

Such an integrated television receiver, with decoding means suited to the reception of the encoded transmissions disclosed above, will now be described, with reference to FIG. 19.

Figure 19:
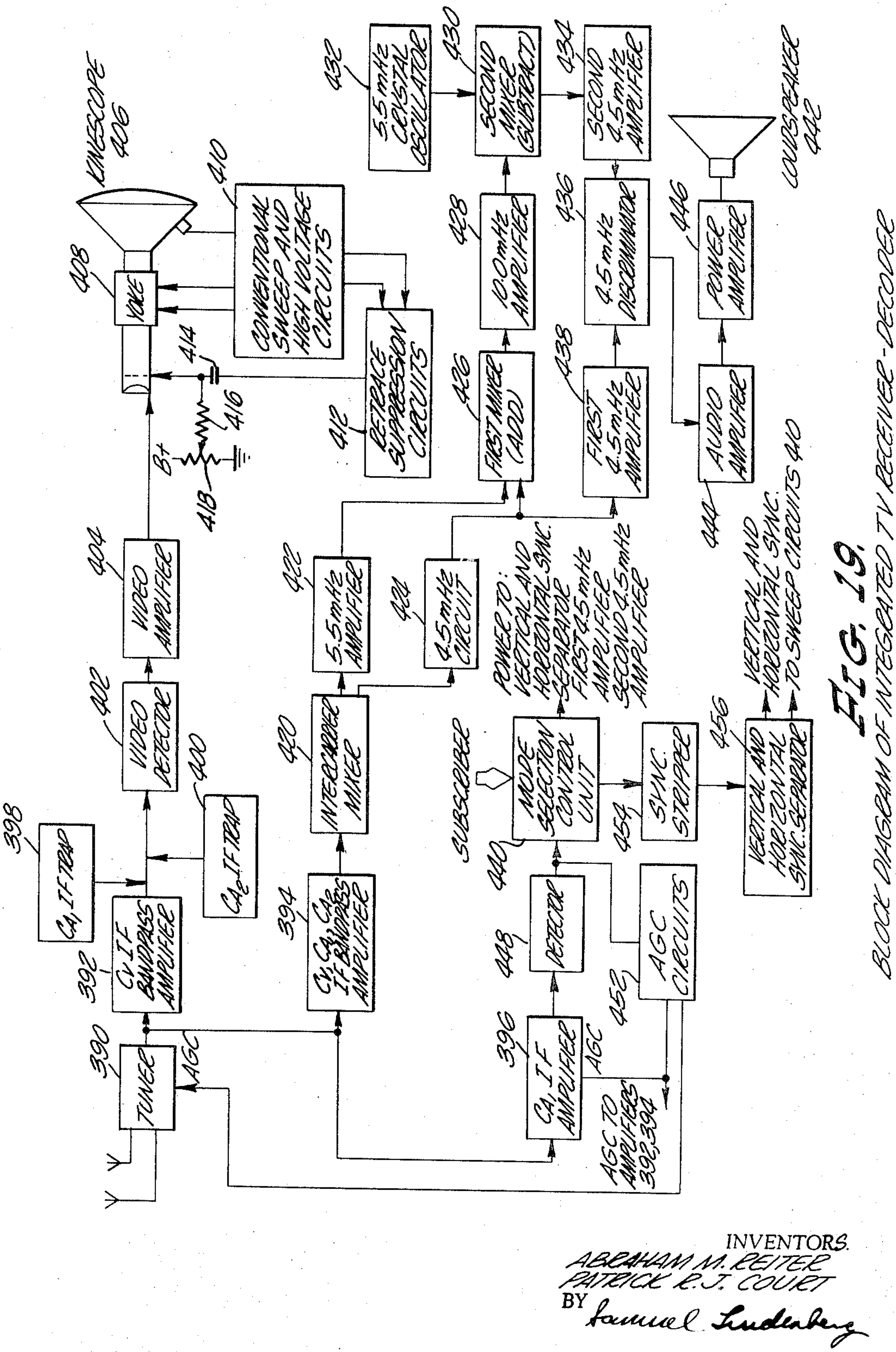
FIG. 19 is a block schematic diagram of an integrated television receiver decoder.

In FIG. 19, the receiver is provided with a conventional tuner 390 which may be either UHF or VHF or both, which of course contains a local oscillator with a frequency tolerance $\Delta$. The incoming IF carriers $C_V$, $C_{A1}$ and $C_{A2}$ are converted to appropriate IF frequencies which have been defined earlier, and these IF carriers are applied to a $C_V$ IF bandpass amplifier 392, as well as to a $C_V$, $C_{A1}$, $C_{A2}$ IF bandpass amplifier 394 and a $C_{A1}$ IF amplifier 396. The $C_V$ IF amplifier 392, in conjunction with traps 398 and 400, presents only the 45.75 mHz. IF video carrier, modulated with grey-blank video with either positive or negative modulation polarity, to video detector 402. The output of detector 402, amplified by video amplifier 404 is applied to the cathode of a kinescope 406. Kinescope 406 is provided with a conventional yoke 408 and is provided with normal sweep deflection signals and high voltage from well known circuits in box 410. The retrace suppression circuits 412 derive inputs from the vertical and horizontal sweep generators in box 410 and develop a composite retrace suppression signal for application tothe grid of kinescope 406 through a coupling network including a serially connected capacitor 414 and a resistor 416, connected to a potentiometer 418, connected across B+. Potentiometer 418 is a conventional brightness control. The retrace suppression circuits 412 are well known in the art and need not be detailed herein. The suppression signal output, however, should be sufficient so that no retrace is visible with grey-blank video, which it will be recalled, is established at grey level rather than the normal black level.

The $C_V$, $C_{A1}$, $C_{A2}$ IF bandpass amplifier 394 allows all three carriers to be amplified and applied to intercarrier mixer 420. However, the pass band is shaped so that the peak amplitude of the $C_{A2}$ IF carrier at 41.25 mHz., which has no amplitude modulation, is smaller than the minimum amplitude of either the $C_V$ IF carrier at 45.75 mHz. or the $C_{A1}$ IF carrier at 46.75 mHz. Both of the latter, of course, have amplitude modulations thereon. Among the many frequencies generated by intercarrier mixer 420 are the intercarrier difference frequency at 5.5 mHz. between the $C_{A1}$ and $C_{A2}$ IF carriers, and the 4.5 mHz. intercarrier difference frequency between the $C_V$ and the $C_{A2}$ IF carriers. From the detailed analyses given earlier, for similar mixing arrangements, it is clear that the 5.5 mHz. signal, which is selected and amplified by an amplifier 422, is $$5.5-\ p-\frac{fi}{2}$$

and the 4.5 mHz. signal which is selected by the 4.5 mHz. circuit 424 is $$4.5+\frac{fi}{2}$$

Because of the amplitude relationships in mixer 420, both signals are substantially free of AM and both are applied to an additive first mixer 426 yielding an output at 10.0 mHz. which is clearly $10.0-fp$. This signal is applied to a second mixer 430 through 10 mHz. amplifier 428, and mixed subtractively with a steady signal from 5.5 mHz. crystal oscillator 432. The 4.5 mHz. difference frequency output from mixer 430 will clearly be understood from previous analyses, to be $4.5-fp$, and this is selected by second 4.5 mHz. amplifier 434 and is available as a second alternative input to 4.5 mHz. discriminator 436. The first alternative input to discriminator 436 is a second 4.5 mHz. signal output from a first 4.5 mHz. amplifier 438 which derives its input from the 4.5 mHz. circuit 424. This signal is of course $$4.5+\frac{fi}{2}$$

Power to the two 4.5 mHz. amplifiers 438 and 434 is derived from a mode selection control unit 440, and in response to actions by the subscriber, either amplifier 438 or 434 is turned on, but not both together. The 4.5 mHz. discriminator 436 thus either receives one 4.5 mHz. FM signal or the other, to be demodulated therein. The audio output from discriminator 436 is reproduced by a loudspeaker 442 following amplification in amplifiers 444 and 446.

The $C_{A1}$ IF carrier at 46.75 mHz. is amplified in amplifier 396 and applied to a detector 448 which recovers the composite restoring, code and code checking signal from its input. This signal is applied to the mode selection control unit 440 and to the AGC circuits 452. The latter generate suitable AGC voltages for regulating the gain of the tuner 390, and IF amplifiers 392, 394 and 396.

The detailed operation of the mode selection control unit 440 has been described previously and in response to appropriate actions by the subscriber, it will deliver an input to a sync stripper 454 which is the composite restoring, code and code checking signal of waveform 8E, either with or without periodic abrupt phase shifts. The sync stripper 454 employs conventional techniques to recover only the composite sync restoring waveform from its input and rejects the smaller amplitude code tones and code checking tone. Its output is applied to a vertical and horizontal sync separator 456 which employs well known techniques to separate vertical and horizontal sync from the composite sync input, and applies these directly to the sweep circuits in box 410.

From the prior detailed description of the mode selection control unit 440 it will now be understood that if the subscriber selects the correct code and, if a charge is made for the program he either pays or signifies his willingness to pay, then power will be applied to the vertical and horizontal sync separator 456. Furthermore, the input to the separator, derived from sync stripper 454, will consist of steady composite sync devoid of periodic abrupt phase shifts. Thus the sweep circuits in box 410 will be correctly synchronized and a properly decoded picture will be displayed by the kinescope 406. Furthermore, power will be applied to second 4.5 mHz. amplifier 434 but not to first 4.5 mHz. amplifier 438 and so the input to discriminator 436 will be a signal defined as $4.5-fp$. This is, of course, a 4.5 mHz. carrier, frequency modulated $\pm 25$ kHz. with program audio, which is demodulated by discriminator 436. The program audio output is then amplified and reproduced by loudspeaker 442.

If the subscriber does not pay, or signify his willingness to pay, power will be denied to the sync separator 456 which, in any event, now has an input with periodic abrupt phase shifts, from sync stripper 454. No sync will therefore be furnished to the sweep circuits and the kinescope now reproduces a nonsynchronized and hence, nonentertaining picture. Power will be applied to the first 4.5 mHz. amplifier 438 and not to the second amplifier 434. The input to discriminator 436 will now be $$4.5+\frac{fi}{2}$$

which is of course a 4.5 mHz. carrier, frequency modulated ±12.5 kHz. with program information audio, The program information audio is demodulated and reproduced by the loudspeaker.

It should be noted that, if desired, it is easily possible, before payment is signified, to deny power to the video amplifier 404. This results in the "unpaid" subscriber being presented with a blank screen, instead of a nonentertaining picture. Program information audio is of course reproduced as before through loudspeaker 442.

The economic advantages of providing an integrated receiver decoder, where circumstances allow it, are clearly evident from an examination of the block diagram of FIG. 19, with reference also to FIGS. 9 and 18 and knowledge of the basic block diagram of any normal television receiver.

In FIG. 19, the tuner 390, $C_V$ IF bandpass amplifier 392, traps 398 and 400, detector 402, and video amplifier 404 are normally part of any standard television receiver, as are the sync stripper 454, vertical and horizontal sync separator 456, AGC circuits 452, first 4.5 mHz. amplifier 438, 4.5 mHz. discriminator 436, audio amplifier 444, power amplifier 446 and loudspeaker 442. It also goes without saying that the same is true of the kinescope 406, yoke 408, sweep and high voltage circuits 410 and the B+ power supply (not shown). Examination of FIGS. 9 and 18 reveal that a considerable proportion of these, or similar, items have to be duplicated in a separate decoder attachment.

Furthermore, as one of the functions of a television receiver is to separate sync from composite video, there is no point in recombining the separately transmitted grey-blank video and synchronizing information as must be done in a decoder attachment if the signals are to be presented to a normal receiver. There is also no need to recreate the blanking information in an integrated receiver, because the use of adequate retrace suppression will avoid visible retrace.

Finally, of course, there is no need to recreate correctly modulated video and audio carriers, properly positioned with respect to each other, and with the proper amplitude relationship, as is done in FIGS. 9 and 18. As a result, there is a considerable overall economy in the additional circuits that must be furnished in an integrated receiver, as compared with a normal receiver, in order to provide the capability of receiving the encoded transmissions described herein.

There has accordingly been described herein a novel and useful subscription television system wherein both the broadcast video and audio are made very secure against unauthorized users. The grey-blank video provides no easily obtainable clue for properly replacing sync and blanking signals. The reconstituting signals are encoded in a manner so that they too do not provide the requisite signals. A further impediment in the path of an unauthorized user is the use of the code checking signals. Finally, the use of unequal deviations due to program information of the $C_{A1}$ and $C_{A2}$ carriers precludes the use of simple intercarrier cancellation of the disturbing program information audio and the difficulty and cost of modifying a television receiver to obtain an entertaining result becomes prohibitive. It is within the scope of this invention to employ other deviation ratios other than 2:1, for example $fi/3$ or $2fi/3$ or $3fi/4$ with the deviation of the $C_{A1}$ carrier still left at $fi$. The use of these odd ratios actually enhances the system security further at the cost, however, of providing more complex circuits in the decoders located at authorized receivers.

One of the important results achieved by this invention is the provision of an arrangement wherein a standard television transmitter can be easily converted to a subscription television transmitter by adding an auxiliary transmitter. Heretofore, it had been necessary to modify the standard transmitter extensively, whereby once a modification was made, the transmitter thereafter could only be used as a subscription television transmitter. With the present invention, either the ordinary or subscription television mode is available.

What is claimed is:

1. A subscription television system comprising a transmitter having means for generating grey-blank video signals which comprise lines of video signals separated by a grey level region instead of by the usual composite sync signals, means for generating reconstituting signals for reconstituting the composite sync signals including blanking signals in said grey-blank video signals, means for generating code tone signals, means for encoding said reconstituting signals responsive to said code tone signals, means for generating program audio signals, and means for generating program information audio signals, means for generating video carrier signals, means for generating a first audio carrier signal spaced from said video carrier signals, means for generating a second audio carrier signal spaced from said video carrier signals, means for amplitude modulating said video carrier signal with said grey-blank video signals, means for frequency modulating said second audio carrier signal with program information audio signals, means for modulating said program audio signals, said program information audio signals, said code tone signals and said reconstituting signals on said first audio carrier, and means for combining for transmission said three modulated carriers.

2. A subscription television system as recited in claim 1 wherein the means for modulating the program audio, program information audio, reconstituting signals and code tone signals on said first audio carrier includes means for frequency modulating said program information audio on said first audio carrier with a frequency deviation which is a multiple of the frequency deviation with which said program information audio is frequency modulated on said second audio carrier.

3. A subscription television system as recited in claim 1 wherein said means for generating code tone signals includes means for generating a plurality of different code tones, means for selecting a predetermined number of said code tones, and means for randomly selecting a predetermined one of said selected code tones during vertical retrace; and said means for encoding said reconstituting signals responsive to said code tone signals includes switch means having two inputs and one output, delay line means connected to one of said two inputs, means for applying said reconstituting signals to both said delay line means and to the other of said two inputs, and means responsive to the randomly selected tones for actuating said switch means to connect its output to one or the other of said two inputs.

4. A subscription television system as recited in claim 1 wherein there is included at a subscriber's location receiving means for said three modulated carriers, said receiving means including means for converting said respective video, first audio and second audio carriers respectively to video, first audio and second audio, intermediate frequency carriers, means for demodulating said code tones and said encoded reconstituting signals from said first audio carrier, means for decoding said encoded reconstituting signals responsive to said code tones to produce decoded reconstituting signals, means for removing said first and second intermediate frequency audio carriers from said intermediate frequency video carrier, means for reconstituting sync and blanking signals in said intermediate frequency video carrier responsive to said decoded reconstituting signals to produce an intermediate frequency video carrier modulated with composite sync, blanking and video signals, and means for combining said first and second intermediate frequency audio carriers to produce a third carrier modulated with program audio signals.

5. A subscription television system as recited in claim 4 wherein there is included a means for checking said decoded reconstituting signal for detecting a correct reconstituting signal, means for generating a control signal responsive to said means for checking detecting an incorrect reconstituting signal, and means for utilizing said control signal.

6. A subscription television system as recited in claim 1 wherein there is included means for generating code checking tone signals, means for combining said code tones, encoded reconstituting signals and code checking tone signals, and means for amplitude modulating said combined signals upon said first audio carrier.

7. A subscription television system as recited in claim 6 wherein there is included a subscriber's location receiving means for said three modulated carriers, said receiving means including means for converting said respective video, first audio and second audio carriers respectively to video, first audio and second audio, intermediate frequency carriers, means for demodulating said code checking tone signals, code tones and encoded reconstituting signals from said first audio carrier, means for decoding said encoded reconstituting signals responsive to said code tones to produce decoded reconstituting signals and code checking signals, means to which said decoded reconstituting signals and code checking signals are applied for detecting an incorrect reconstituting signal, means responsive to said means for detecting an incorrect reconstituting signal for generating a control signal indicative thereof, means for utilizing said control signal, means for removing said first and second intermediate frequency audio carriers from said intermediate frequency video carrier, means for reconstituting sync and blanking signals in said intermediate frequency video carrier responsive to said decoded reconstituting signals to produce an intermediate frequency video carrier modulated with composite sync, blanking and video signals, and means for combining said first and second intermediate frequency audio carriers to produce a third carrier modulated with program audio signals.

8. In a subscription television system of the type wherein at a transmitter there are means for generating program audio signals and program information audio signals, means for hiding said program audio signals from an unauthorized receiver comprising means for generating a first audio carrier, means for generating a second audio carrier which is displaced in frequency from said first audio carrier, means for frequency modulating said program audio and said program information audio on said first audio carrier, means for frequency modulating said program information audio on said second audio carrier with a frequency deviation which is different from the frequency deviation of the frequency modulation of said program information audio on said first audio carrier including means for generating a video carrier, means for generating a first carrier having the fequency of said second audio carrier plus a first intermediate frequency, means for generating a third relatively low frequency audio carrier, means for frequency modulating said third relatively low frequency audio carrier with said program audio, first subtractive mixer means to which said first carrier and video carrier are applied, second subtractive mixer means to which said second audio carrier frequency modulated with said program information audio and said first carrier are applied, third subtractive mixer means to which the outputs of said first and third subtractive mixer means are applied, fourth subtractive mixer means to which the output of said third subtractive mixer and said frequency modulated third relatively low frequency audio carrier are applied, fifth additive mixer means to which the outputs of said third and fourth mixers are applied, and sixth subtractive mixer means to which the outputs of said fifth mixer means and said first carrier are applied, and means for diplexing said first and second frequency modulated audio carriers for transmission.

9. In a subscription television system as recited in Claim 8 including means for receiving said first and second audio carriers, means for respectively converting said first audio carrier to a first intermediate frequency carrier and said second audio carrier to a second intermediate frequency carrier, means for mixing said first and second intermediate frequency carriers to produce a third carrier having the program information audio frequency modulated thereon with the same deviation as the program information audio is frequency modulated on said second intermediate frequency carrier, means for subtractively mixing said third carrier with said second intermediate frequency carrier to produce a fourth carrier which is frequency modulated by said program audio.

10. A subscription television system including means for generating grey-blank video signals which comprise composite video signals with grey level signals in those portions wherein there are usually sync and blanking signals, means for generating reconsituting signals for reconstituting the blanking and sync signals for said grey-blank video signals, means for encoding said reconstituting signals comprising means for generating a plurality of different tones, means for selecting a predetermined number of said different tones, means for randomly selecting said selected tones during a vertical retrace interval of said grey-blank video signals, means for combining said randomly selected tones and said reconstituting signals, switch means having a first and a second input and an output switchable between said two inputs, means for applying said combined tone and reconstituting signals to one of said switch mean inputs, a delay line connected to the other of said switch mean inputs, means for applying said combined tone and reconstituting signals to said delay line, means for switching the output of said switch means from one or the other of its inputs responsive to said randomly selected tones, means for generating a carrier, means for amplitude modulating said output of said switch means on said carrier, means for generating a video carrier, means for amplitude modulating said grey-blank video on said video carrier, and means for transmitting said modulated additional carrier and second video carrier.

11. In a subscription television system as recited in claim 10, a receiver for said transmitted modulated video carrier and modulated additional carrier comprising means for receiving said video and additional carriers and converting them respectively to a modulated video IF carrier and a modulated additional IF carrier, means for demodulating the amplitude modulation on said additional carrier to derive said tone signals and said reconstituting signals, a plurality of filter means to which said tone signals are applied, means for selectively connecting to predetermined ones of said filter means for deriving therefrom tone signals corresponding to those randomly selected at said transmitter, switch means having two inputs and an output switchable between said two inputs, delay line means connected to one of said two switch mean inputs, said delay line means having a delay corresponding to the delay at said transmitter, means for applying said reconstituting signals to said delay line means and to the other of said two switch means inputs, means for switching said switch means output between its two inputs responsive to said tones selected from said filter to produce at the output of said switch means reconstituting signals which have been compensated for the delay inserted at said transmitter, and means for reconstituting said grey-blank video signals while modulated on said intermediate frequency carrier with sync and blanking signals responsive to said reconstituting signals at the output of said switching means.

12. A receiver as recited in claim 11 wherein said means for reconstituting said grey-blank video while modulated on said IF carrier comprises an intermediate frequency amplifier to which said grey-blank video IF carrier is applied, first means for establishing the gain of said intermediate frequency amplifier at a first level over the duration of a reconstituting signal, second means for establishing the gain of said intermediate frequency amplifier at a second level different from said first level responsive to a reconstituting signal over an interval which exceeds the interval of said reconstituting signal whereby said sync and blanking signals are reinserted in said grey-blank video.

13. A receiver as recited in claim 11 wherein there is included means for checking the output of said switch means to determine whether said reconstituting signal has been properly compensated for the delay introduced at said transmitter, comprising means for detecting a phase change in said reconstituting signal, means responsive to detection of a phase change for producing a control signal, and means responsive to said control signal for indicating that said reconstituting signal has not been properly compensated.

14. Apparatus as recited in claim 11 wherein said means for detecting an improper compensation of said reconstituting signal comprises means for generating a steady state signal from said reconstituting signals, means for detecting an aberration of said steady state signal as a result of an improper compensation of said reconstituting signal, means responsive to the detection of an aberration for generating a control signal responsive thereto.

15. Apparatus as recited in claim 11 wherein said means for detecting an improper compensation of said reconstituting signal comprises a harmonic generator to which said output of said switching means is applied, a high Q circuit tuned to the harmonic of said harmonic generator, and means connected to the output of said high Q tuned circuit for detecting a discontinuity in said output as a result of the improper compensation of said reconstituting signal, means responsive to the detection of said discontinuity for generating a control signal, and means responsive to said control signal for indicating said failure to properly compensate said reconstituting signal.

16. In a subscription television system of the type wherein a transmitter sends grey-blank video amplitude modulated on a video carrier, program information audio frequency modulated on a first audio carrier which is displaced in frequency from said video carrier, program audio and program information audio respectively frequency modulated on a second audio carrier displaced in frequency from said video carrier and said first audio carrier, encoded reconstituting signals for reinserting, when decoded, blank and sync signals in said grey-blank video signals, tone coding signals for decoding said encoded reconstituting signals, said tone coding signals and encoded reconstituting signals being amplitude modulated upon said second audio carrier, a receiver for receiving and utilizing said signals, said receiver including means for respectively converting said two audio carriers and said video carrier to two intermediate frequency audio carriers and an intermediate frequency video carrier each of which bears the modulation of the respective carriers, means for separating said intermediate frequency video carrier from said first and second intermediate frequency audio carriers, means for deriving said grey-blank video from said video intermediate frequency carrier, a cathode ray tube, and means for applying said grey-blank video to said cathode ray tube to control the intensity of the cathode ray beam thereof, an audio signal reproducing circuit, means for deriving said program information audio from said first intermediate frequency audio carrier, means for applying said program information audio to said audio signal reproducing circuit whereby said program information audio is heard, means for deriving said tone code signals and said reconstituting signals from said second intermediate frequency audio carrier, means for decoding said encoded reconstituting signals responsive to said code tone control signals, means responsive to said decoded reconstituting signals for generating vertical and horizontal sync signals, means for applying said vertical and horizontal sync signals to said cathode ray tube for deflecting said cathode ray beam responsive thereto, whereby intelligible video may be seen, means responsive to the decoded reconstituting signals for producing a control signal, means responsive to said control signals for inactivating said means for deriving said program information audio from said first intermediate frequency audio carrier, means for deriving said program audio from said second information carrier activated responsive to said control signal, and means for applying said program audio to said audio reproducing circuit whereby said program audio is heard.

17. A receiver as recited in claim 16 wherein said means for deriving said program information audio includes an intercarrier mixer for mixing said first and second audio intermediate frequency carriers and said video intermediate frequency carrier for producing a third carrier modulated with program information audio and a fourth carrier frequency modulated with program information audio and program audio, and means for separating said third carrier modulated with program information audio from the output of said intercarrier mixer, and wherein said means for deriving said program audio includes means for separating said fourth carrier from said intercarrier mixer output, means for additively mixing said third and fourth carriers to produce a fifth carrier frequency modulated with said program audio, and means for deriving said program audio from said fifth carrier.

18. In a subscription television system of the type wherein there is transmitted grey-blank video comprising composite video with grey level signals in place of sync and blanking signals, encoding signals and reconstituting signals comprising a pulse train having the frequency of said sync signals, said reconstituting signals being encoded by said encoding signals, a receiver for said signals including an amplifier to which said grey-blank video signals are applied, means for decoding said encoded reconstituting signals responsive to said encoding signals, first means to which said decoded reconstituting signals are applied for increasing the gain of said amplifier only in the presence of a reconstituting signal pulse, second means driven by said first means for increasing the gain of said amplifier to a second level for a predetermined interval after the termination of a reconstituting pulse, said first level to which the gain of said amplifier is increased increasing the grey-blank portion of said grey-blank video signal to the sync signal level, said second level changing the gain of said amplifier to amplify a grey sync level signal to a blanking pulse level.

19. In a subscription television system as recited in claim 18 wherein said receiver includes means responsive to said decoded reconstituting signals for detecting an aberration therein, means responsive to the detection of an aberration to generate a control signal, and means responsive to said control signal to indicate the presence of an aberration in said reconstituting signals.

20. In a subscription television system wherein there are transmitted grey-blank video signals comprising composite video signals wherein a grey level signal is present where blanking and synchronizing signals are normally present, reconstituting signals for reinserting said sync and blanking signals in said grey-blank video signals, said reconstituting signals being encoded in accordance with code tone signals for decoding said encoded reconstituting signals, and checking tone signals combined with said reconstituting and code tone signals, said checking tone signals and said code tone signals having frequencies which are large compared to the frequency of said reconstituting signals, a receiver having means for decoding said encoded reconstituting signals responsive to said code tone encoding signals, means for augmenting the grey level portions of said grey-blank video to sync and blank level signals responsive to said decoded reconstituting signals, means for utilizing for detecting code checking signals whether or not said reconstituting signals have been properly decoded to generate a control signal, and means responsive to said control signal to prevent operation of said means for augmenting.

21. A receiver as recited in claim 20 wherein said means for detecting whether or not said reconstituting signals have been properly decoded to generate a control signal includes high Q tuned circuit means to which said checking tone signals are applied, said high Q tuned circuit means being tuned to said checking tone frequency, and means connected to said high Q tuned circuit means output for detecting an aberration in said output due to improper decoding of said reconstituting signal for producing a control signal responsive thereto.

22. An attachment for a television transmitter for converting it to a subscription television transmitter, a television transmitter including means for generating composite video signals including composite sync and blanking signals, means for generating program audio signals, means for generating a video carrier, means for generating a first audio carrier, video carrier modulating means, audio carrier modulating means, and first means for diplexing the outputs of said video carrier modulating means and audio carrier modulating means, said attachment including means for generating program information audio, means for applying said program audio to said audio carrier modulating means for being frequency modulated thereby on said first audio carrier, means for generating reconstituting signals, means responsive to said reconstituting signals for converting said composite video signals into grey-blank video signals wherein there are grey level signals in place of sync and blanking signals, means for applying said grey-blank video signals to said video carrier modulating means to be modulated on said video carrier, means for generating a second audio carrier, means for frequency modulating said program audio and said program information audio on said second audio carrier, means for generating encoding signals, means for encoding said reconstituting signals, responsive to said encoding signals, means for amplitude modulating said encoding signals and encoded reconstituted signals on said second audio carrier with the output of said first means for diplexing.

References Cited

UNITED STATES PATENTS

| | | | |
|---|---|---|---|
| 3,001,011 | 9/1961 | Weiss et al. | 178—5.1 |
| 3,041,389 | 6/1962 | Court et al. | 178—5.1 |
| 3,184,537 | 5/1965 | Court et al. | 178—5.1 |
| 3,231,818 | 1/1966 | Court | 178—5.1 X |
| 3,244,806 | 4/1966 | Morris | 178—5.1 |

RODNEY D. BENNETT, Primary Examiner

M. F. HUBLER, Assistant Examiner

U.S. Cl. X.R.

325—32, 33